United States Patent [19]

Ohta

[11] Patent Number: 4,582,771
[45] Date of Patent: Apr. 15, 1986

[54] DISAZO COMPOUND, METHOD FOR PREPARING THE SAME, AND ELECTROPHOTOGRAPHIC ELEMENT CONTAINING THE SAME FOR USE IN ELECTROPHOTOGRAPHY

[75] Inventor: Masafumi Ohta, Susono, Japan

[73] Assignee: Ricoh Co., Ltd., Tokyo, Japan

[21] Appl. No.: 687,111

[22] Filed: Dec. 28, 1984

[30] Foreign Application Priority Data

Dec. 28, 1983 [JP] Japan .................. 58-250194
Dec. 28, 1983 [JP] Japan .................. 58-250195

[51] Int. Cl.$^4$ .................. G03G 5/06; G03G 5/14
[52] U.S. Cl. .................. 430/58; 430/59; 430/73; 430/75; 430/76; 430/77; 430/78; 430/79; 534/738; 534/759; 534/829; 534/830; 534/831
[58] Field of Search .................. 430/58, 59, 73, 75, 430/76, 77, 78, 79

[56] References Cited

U.S. PATENT DOCUMENTS 4,390,611  6/1983  Ishikawa et al. .................. 430/59

Primary Examiner—Roland E. Martin
Attorney, Agent, or Firm—Flynn, Thiel, Boutell & Tanis

[57] ABSTRACT

This invention relates to a disazo compound, a method for producing said disazo compound and an electrophotographic element containing said disazo compound, said disazo compound has the general formula (I),

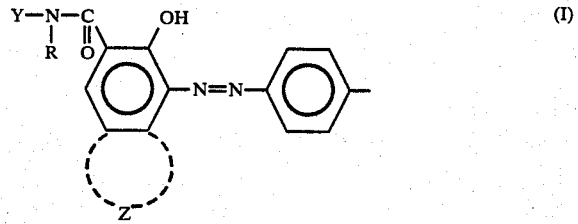
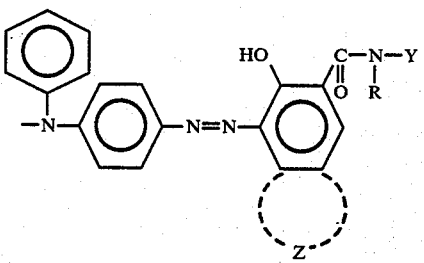

wherein Y represents a substituted or non-substituted cyclic hydrocarbon or substituted or non-substituted heterocycle; R represents hydrogen, substituted or non-substituted alkyl group, or substituted or non-substituted phenyl group; and Z represents a substituted or non-substituted cyclic hydrocarbon or heterocycle fused with phenyl nucleus.

16 Claims, 3 Drawing Figures

DISAZO COMPOUND, METHOD FOR PREPARING THE SAME, AND ELECTROPHOTOGRAPHIC ELEMENT CONTAINING THE SAME FOR USE IN ELECTROPHOTOGRAPHY

BACKGROUND OF THE INVENTION

This invention relates to a diazo compound, method for preparing the same, and electrophotographic element containing the same for use in electrophotography. More particularly, this invention relates to an electrophotographic element having a photosensitive layer containing a disazo compound as a charge generating substance which generates a charge carrier by light irradiation.

Heretofore, there were used inorganic photosensitive materials such as selenium, selenium alloy, cadmium sulfide, zinc oxide and the like. Among them, selenium type photosensitive material was widely used because it has generally superior properties in respect of receiving potential, dark decay, sensitivity and the like. However, the selenium type electrophotographic element has such disadvantages as that the control of properties is difficult since it is prepared by vapor deposition; that the manufacturing cost is high; that it is difficult to work the element into a belt-like product due to lack of flexibility; and that the handling of the element is not easy because it is too sensitive to mechanical impact and heat.

There was also used an element having a photosensitive layer containing an organic photosensitive material superior in flexibility and easy in production, for example, a charge transfer complex of 2,4,7-trinitro-9-fluorenone and poly-N-vinylcarbazole. However, the sensitivity of this element was too low and therefore unsuitable as an electrophotographic element for a high speed copying machine.

Recently, various studies have been carried out to remove disadvantages for these electrophotographic elements. Among them, there is noted a separate function type electrophotographic element wherein the generation of a charge carrier and the transfer of the generated charge carrier are respectively conducted by separate substances. As the separate function type electrophotographic element, there can enumerated a laminated type electrophotographic element having a photosensitive layer prepared by laminating a charge generating layer containing a charge generating substance to generate a charge carrier by light irradiation and a charge transfer layer containing a charge transfer substance to transfer the generated charge, a dispersed type electrophotographic element prepared by dispersing a charge generating substance in a charge transfer medium containing a charge transfer substance, and the like. Since these photosensitive materials are widely selected and it is possible to enhance the sensitivity, they are noted as an electrophotographic element for a plain paper copier.

Examples of these electrophotographic elements include:

(1) a laminated type electrophotographic element using a thin layer formed by vapor depositing perillene derivatives as a charge generating layer and oxadiazole derivatives as a charge transfer layer (U.S. Pat. No. 3,871,882);

(2) a laminated type electrophotographic element using a thin layer formed by coating an organic amine solution of Chloro Dian Blue as a charge generating layer and hydrazone compound as a charge transfer layer (Japanese Patent Publication No. 55-42380); and the like.

However, these conventional laminated type electrographic elements have not only advantages but also various disadvantages. For example, the above electrophotographic element (1) using perillene derivatives and oxadiazole derivatives has a disadvantage that the manufacturing cost is very high because of forming a charge generating layer by vapor deposition. The above electrophotographic element (2) using Chloro Dian Blue and hydrazone compound must use an organic amine (for example, ethylene diamine) as a coating solvent for forming a charge generating layer, which is difficult in handling.

As a photosensitive material having a good sensitivity which can be easily manufactured, there are enumerated a photosensitive material using a disazo pigment having styrylstilbene structure as a charge generating substance (Japanese Laid Open No. 53-133445); a photosensitive material using a diazo pigment having dibenzothiophene structure as a charge generating substance (Japanese Laid Open No. 54-21728); a photosensitive material using a disazo pigment having carbazole structure (Japanese Laid Open Nos. 53-95033 and 53-95966); a photosensitive material using a trisazo pigment having triphenyl amine structure (Japanese Laid Open No. 53-132347); a photosensitive material using a disazo pigment having oxazole structure (Japnese Laid Open No. 54-12742); a photosensitive material using a disazo pigment having disstyrylcarbazole structure (Japanese Laid Open No. 54-14967); a photosensitve material using a disazo pigment having bisstilbene structure (Japanese Laid Open No. 54-17733); a photosensitive material using a disazo pigment having fluorenone structure (Japanese Laid Open No. 54-22834); and the like. However, these conventional photosensitizers also have merits and demerits, and a development of new photosensitive materials having better properties is desired.

SUMMARY OF THE INVENTION

An object of the present invention is to provide a disazo compound expressed by the general formula (I),

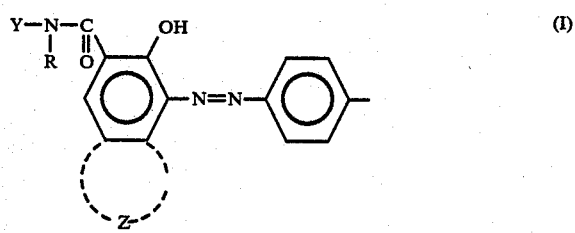

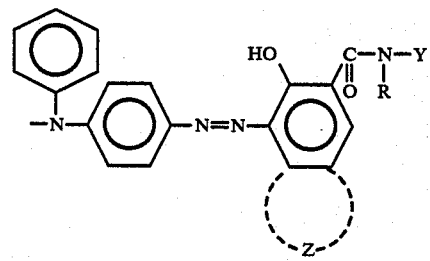

wherein Y represents a substituted or non-substituted cyclic hydrocarbon or substituted or non-substituted heterocycle; R represents hydrogen, substituted or non-substituted alkyl group, or substituted or non-substituted phenyl group; and Z represents a substituted or non-substituted cyclic hydrocarbon or substituted or non-substituted heterocycle fused with phenyl nucleus.

Another object of the present invention is to provide a method for preparing a disazo compound expressed by the neneral formula (I),

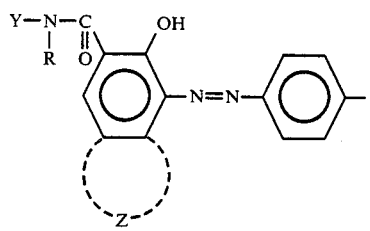

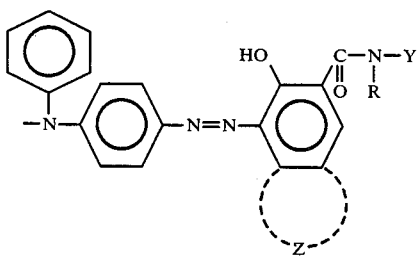

wherein Y, R and Z are the same as mentioned above, characterized by diazotizing 4,4'-diaminotriphenyl amine expressed by the general formula (II),

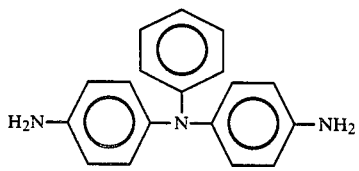

to produce a tetrazonium salt expressed by the general formula (III),

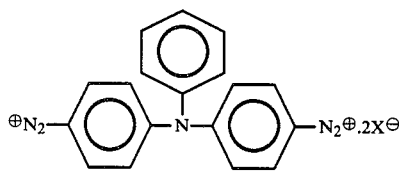

wherein X represents an anion functional group, and reacting the thus produced tetrazonium salt with a coupler expressed by the general formula (IV),

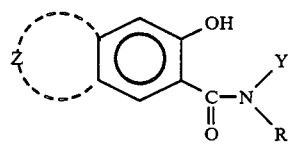

wherein Y, R and Z are the same as mentioned above.

The other object of the present invention is to provide a photosensitive material for use in electrophotography, characterized by that said photosensitive material has on an electroconductive substrate a photosensitive layer containing a disazocompound expressed by the general formula (V),

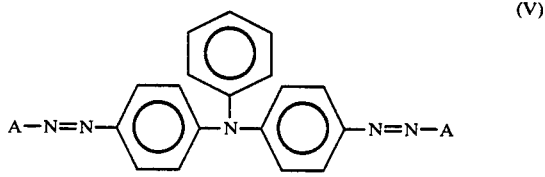

wherein A represents a residue of a coupler.

DETAILED DESCRIPTION OF THE INVENTION

Examples of the cyclic hydrocarbon of Y in the general formula (I) of the disazocompound of the present invention include benzene ring, naphthalene ring or the like, and examples of the heterocycle of Y include dibenzofuran ring, carbazole ring or the like. Examples of a substituent of the cyclic hydrocarbon or heterocycle of Y include a lower alkyl group such as methyl, ethyl, propyl, butyl and the like; a lower alkoxy group such as methoxy, ethoxy, butoxy and the like; a lower dialkyl amino group such as N,N-dimethylamino, N,N-diethylamino, N,N-dibutylamino groups and the like; a halogen atom such as fluorine, chlorine, bromine and the like; a halomethyl group such as trifluoromethyl and the like; a lower alkylcarboxyl group such as ethylcarboxyl group; carboxyl group; cyano group; nitro group; —SO₃Na and the like.

Examples of the alkyl group of R include a lower alkyl group such as methyl, ethyl, and the like. Examples of the substituent of the alkyl group or phenyl group of R include a halogen atom such as chlorine.

Examples of the cyclic hydrocarbon of Z include benzene ring, naphthalene ring, and the like, and examples of the heterocycle include indole ring, benzofuran ring, carbazole ring and the like. Examples of the substituent of the cyclic hydrocarbon or the heterocycle include a halogen atom such as chlorine.

Examples of the coupler of the disazocompounds expressed by the general formula (V) include a compound having a phenolic hydroxyl group such as phenol type, naphthol type compounds and the like; an aromatic amino compound having an anino group; an aminonaphthol type compound having an amino group and a phenolic hydroxyl group; a compound having an aliphatic or aromatic enol type ketone group (active methylene group); and the like. Preferably, the residue A of the coupler is expressed by the following general formula (VI), (VII), (VIII), (IX), (X), (XI), (XII), (XIII), (XIV), (XV), (XVI), (XVII) and (XVIII).

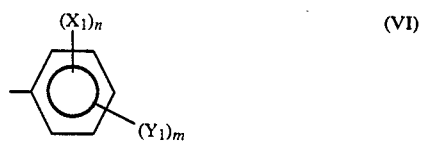

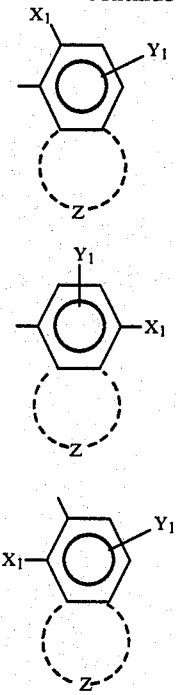

(VII)

(VIII)

(IX)

wherein $X_1$, $Y_1$, $Z$, $m$ and $n$ in the above formula (VI), (VII), (VIII) and (IX) represent the following groups:

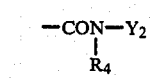

(wherein $R_1$ and $R_2$ represent hydrogen or a substituted or non-substituted alkyl group, and $R_3$ represents a substituted or non-substituted alkyl or a substituted or non-substituted aryl group);

$Y_1$: hydrogen, halogen, substituted or non-substituted alkyl group, substituted or non-substituted alkoxy group, carboxyl group, sulfo group, substituted or non-substituted sulfamoyl group or

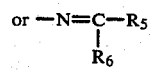

(wherein $R_4$ represents hydrogen, alkyl group or its substituted compound, phenyl group or its substituted compound, and $Y_2$ represents cyclic hydrocarbon or its substituted compound, heterocycle or its substituted compound, $$\text{or} \quad -N=C-R_5 \atop R_6$$

wherein $R_5$ represents a cyclic hydrocarbon or its substituted compound, heterocycle or its substituted compound, or styryl group or its substituted compound, and $R_6$ represents hydrogen, alkyl group, phenyl group or their substituted compound, or $R_5$ and $R_6$ may form a ring with carbons bonded thereto);

Z: cyclic hydrocarbon or its substituted compound, or heterocycle or its substituted compound;

n: an integer of 1 or 2;

m: an integer of 1 or 2.

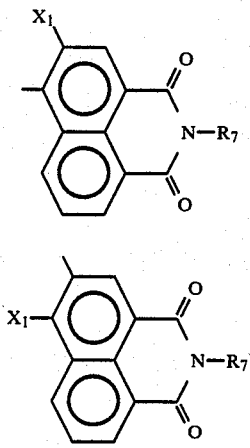

(X)

(XI)

wherein $R_7$ in the above formula (X) and (XI) represents a substituted or non-substituted hydrocarbonyl group, and $X_1$ is the same as mentioned above.

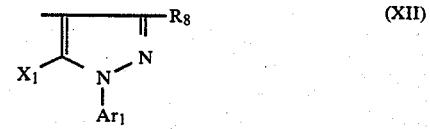

(XII)

wherein $R_8$ represents an alkyl group, carbamoyl group, carboxyl group or its ester, and $Ar_1$ represents a cyclic hydrocabon or its substituted compound, and $X_1$ is the same as mentioned above.

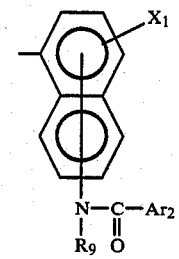

(XIII)

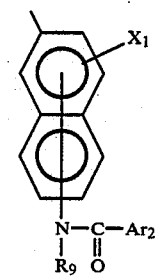

(XIV)

wherein $R_9$ in the above formula (XIII) and (XIV) represents hydrogen or substituted or non-substituted hydrocarbonyl group, and $Ar_2$ represents cyclic hydrocarbon or its substituted compound.

Examples of the cyclic hydrocarbon expressed by Z in the above general formula (VI), (VII), (VIII) or (IX) include benzene ring, naphthalene ring and the like, and examples of the heterocycle expressed by the same include indole ring, carbazole ring, benzofuran ring, dibenzofuran ring and the like. Examples of the substituent of the ring expressed by Z include a halogen atom such as chlorine, bromine, and the like.

Examples of the cyclic hydrocarbon expressed by $Y_2$ or $R_5$ include phenyl, naphthyl, anthryl, pyrenyl and the like, and examples of the heterocyclic group expressed by the same include pyridyl, thienyl, furyl, indolyl, benzofuranyl, carbazolyl, dibenzofuranyl and the like. Examples of the ring formed by bonding $R_5$ and $R_6$ include fluorene ring.

Examples of the substituents for the cyclic hydrocarbon or heterocycle expressed by $Y_2$ or $R_5$ or for the ring formed by bonding $R_5$ and $R_6$ include an alkyl group such as methyl, ethyl, propyl, butyl or the like; an alkoxy group such as methoxy, ethoxy, propoxy, butoxy or the like; a halogen atom such as chlorine, bromine or the like; a dialkyl amino group such as dimethyl amino, diethyl amino or the like; a diaralkyl amino group such as dibenzyl amino or the like; a halomethyl group such as trifluoromethyl or the like; nitro group; cyano group; carboxyl group or its ester; hydroxyl group; sulphonate group such as —SO$_3$Na; and the like.

Examples of the substituent for the phenyl group expressed by $R_4$ include a halogen atom such as chlorine or bromine.

Examples of the hydrocarbonyl group expressed by $R_7$ and $R_9$ include an alkyl group such as methyl, ethyl, propyl, butyl and the like; an aralkyl group such as benzyl and the like; an aryl group such as phenyl; or their substituted compounds.

Examples of the substituent for the hydrocarbonyl group expressed by $R_7$ or $R_9$ include an alkyl group such as methyl, ethyl, propyl, butyl and the like; an alkoxy group such as methoxy, ethoxy, propoxy, butoxy and the like; a halogen atom such as chlorine, bromine and the like; hydroxyl group; nitro group; and the like.

Examples of the cyclic hydrocarbon expressed by $Ar_1$ or $Ar_2$ include phenyl, naphthyl and the like, and examples of the substituents for these groups include an alkyl group such as methyl, ethyl, propyl, butyl or the like; an alkoxy group such as methoxy, ethoxy, propoxy, butoxy or the like; nitro group; a halogen group such as chlorine, bromine or the like; cyano group; and a dialkyl amino group such as dimethyl amino, diethyl amino or the like.

Among the groups expressed by $X_1$, hydroxyl group is particularly suitable.

Among the above coupler residues, preferable ones are expressed by the general formula (VII), (X), (XI), (XII), (XIII) and (XIV), and $X_1$ in the general formula is preferably hydroxyl group. Among them, the coupler residue expressed by the general formula (XV)

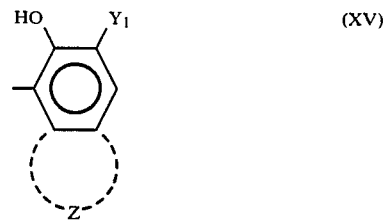

(wherein $Y_1$ and Z are the same as mentioned above) is preferable, and the coupler residue expressed by the general formula (XVI)

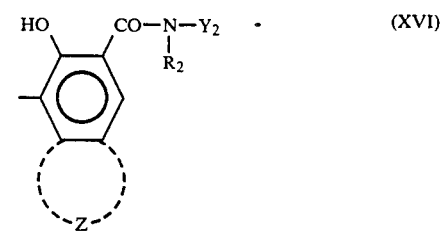

(wherein Z, $Y_2$ and $R_2$ are the same as mentioned above) is more preferable.

Still more preferable coupler residue among the above mentioned groups is expressed by the general formula (XVII) or (XVIII)

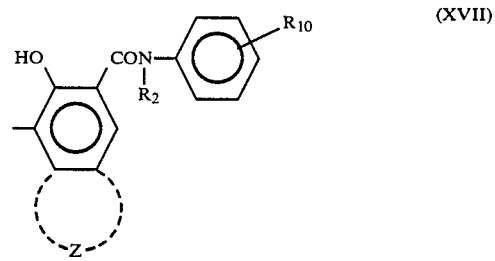

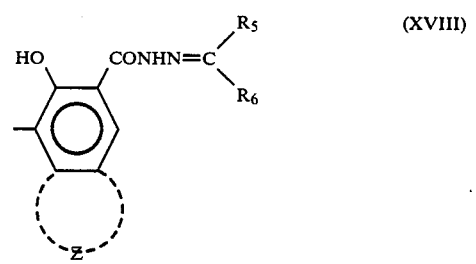

(wherein Z, $R_2$, $R_5$ and $R_6$ are the same as mentioned above, and $R_{10}$ is the same as those illustrated with regard to the substituents for $Y_2$).

Examples of the disazo compound of the present invention are illustrated by the folowing structural formula showing the coupler residue A.

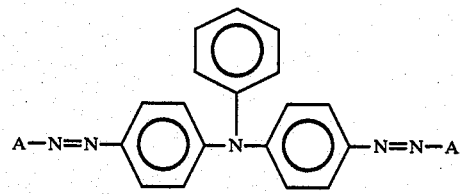
| Disazo Pigment No. | A | Disazo Pigment No. | A |
|---|---|---|---|
| 1 | 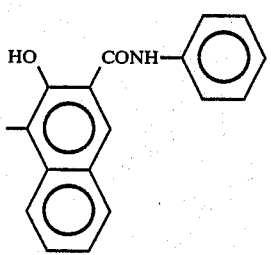 | 2 | 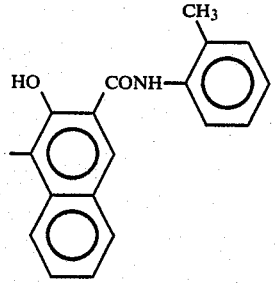 |
| 3 | 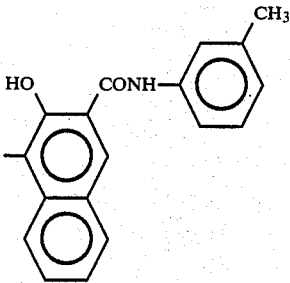 | 4 | 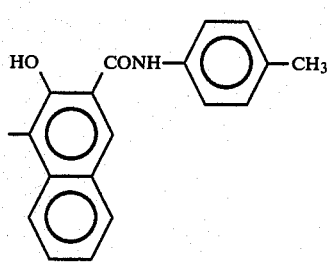 |
| 5 | 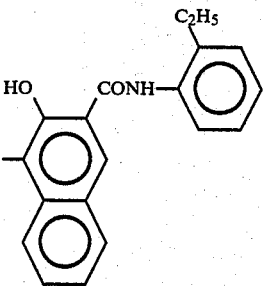 | 6 | 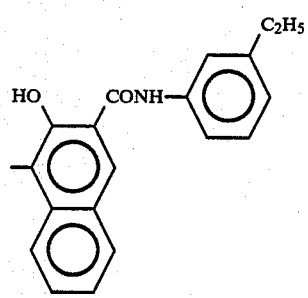 |
| 7 | 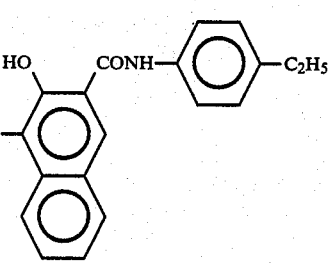 | 8 | 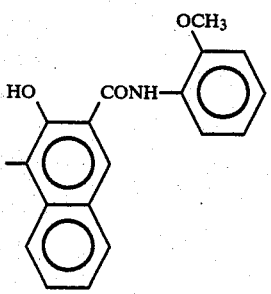 |

-continued
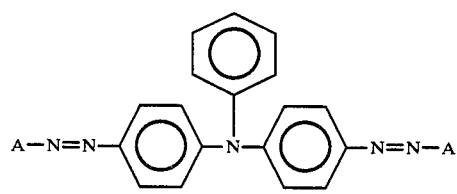
| Disazo Pigment No. | A | Disazo Pigment No. | A |
|---|---|---|---|
| 9 | 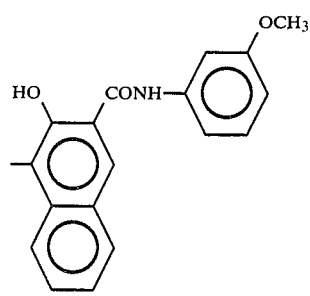 | 10 | 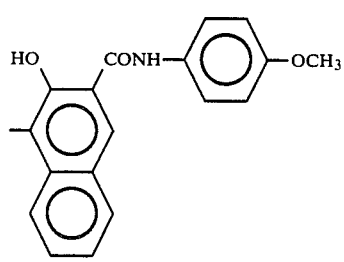 |
| 11 | 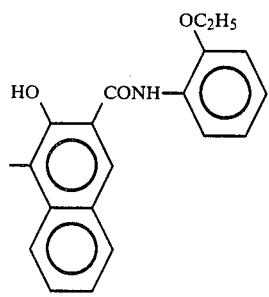 | 12 | 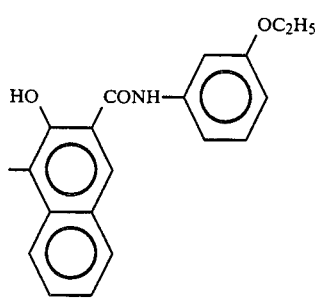 |
| 13 | 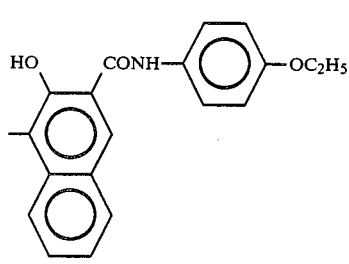 | 14 | 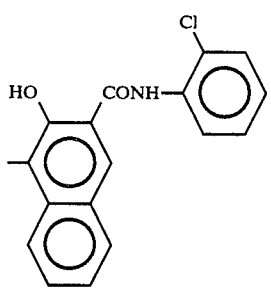 |
| 15 | 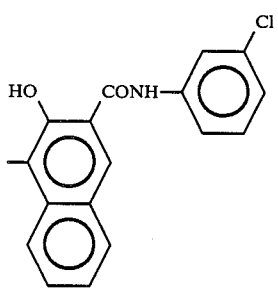 | 16 | 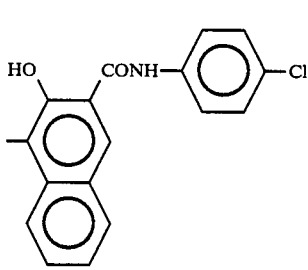 |

-continued
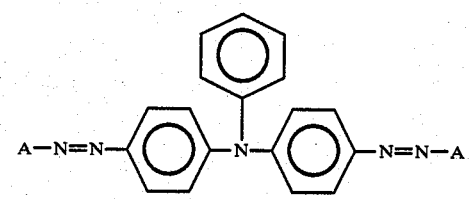
| Disazo Pigment No. | A | Disazo Pigment No. | A |
|---|---|---|---|
| 17 | 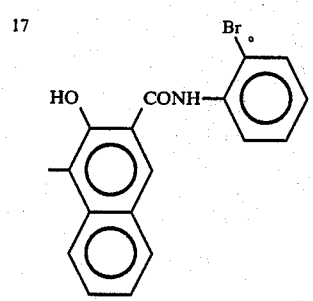 | 18 | 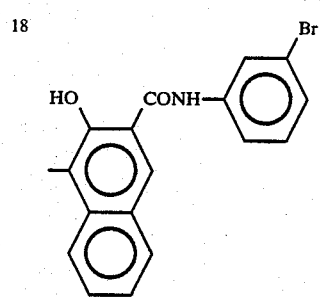 |
| 19 | 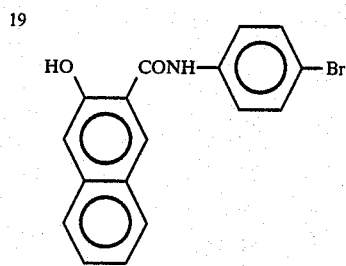 | 20 | 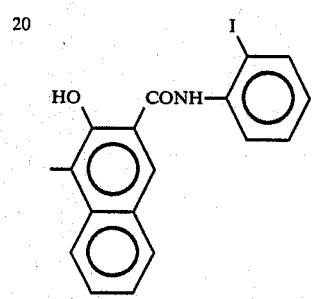 |
| 21 | 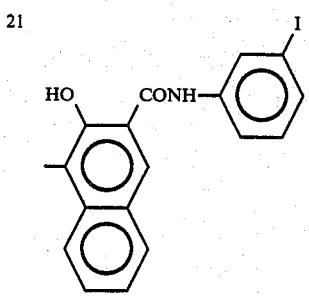 | 22 | 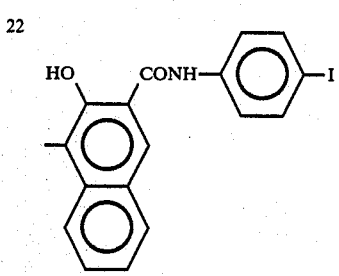 |
| 23 | 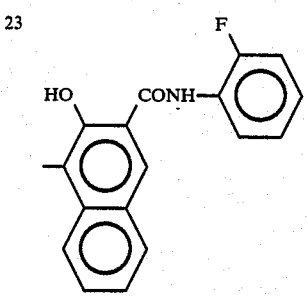 | 24 | 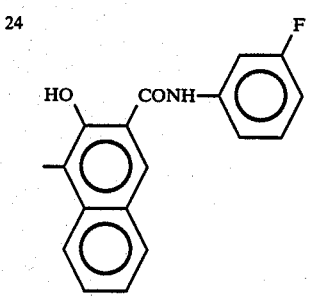 |

-continued
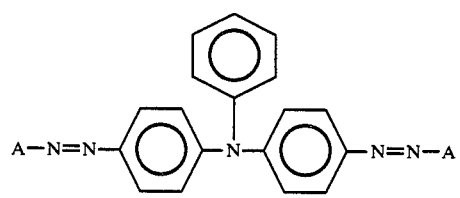
| Disazo Pigment No. | A | Disazo Pigment No. | A |
|---|---|---|---|
| 25 | 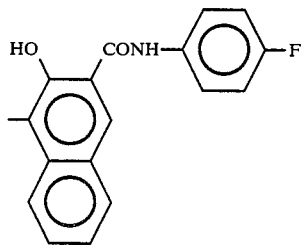 | 26 | 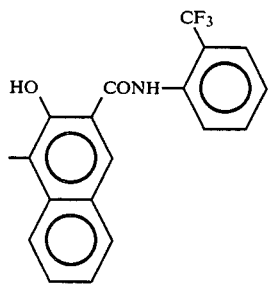 |
| 27 | 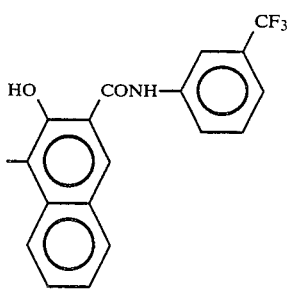 | 28 | 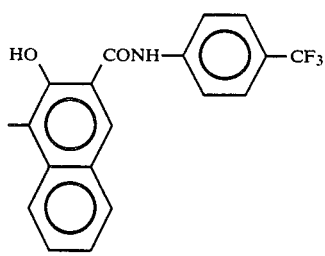 |
| 29 | 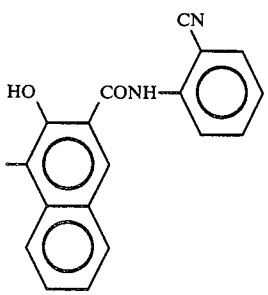 | 30 | 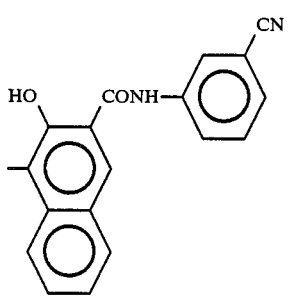 |
| 31 | 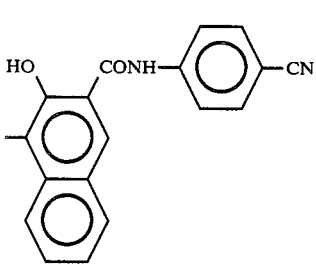 | 32 | 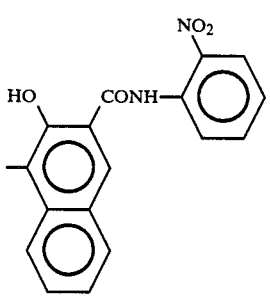 |

-continued
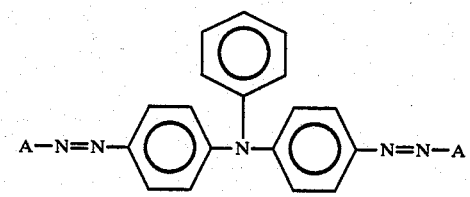
| Disazo Pigment No. | A | Disazo Pigment No. | A |
|---|---|---|---|
| 33 | 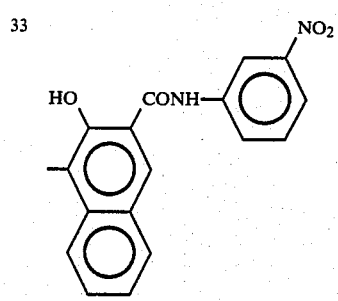 | 34 | 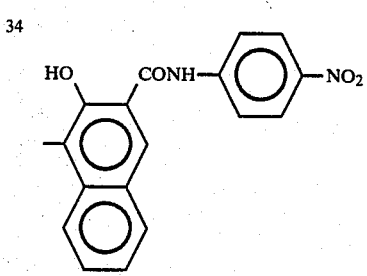 |
| 35 | 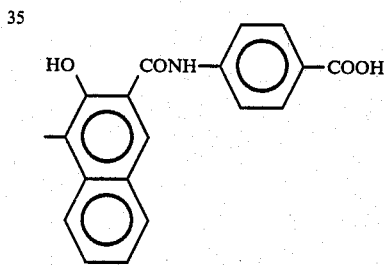 | 36 | 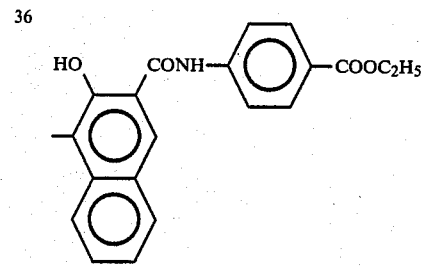 |
| 37 | 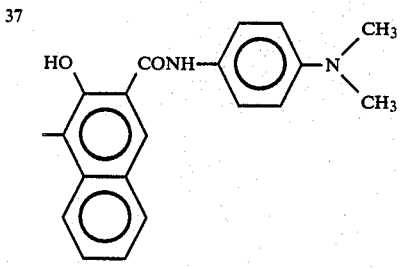 | 38 | 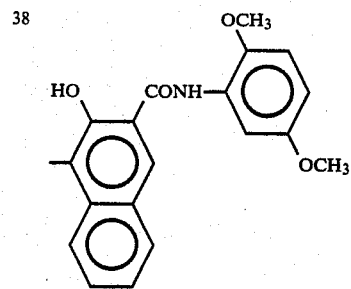 |
| 39 | 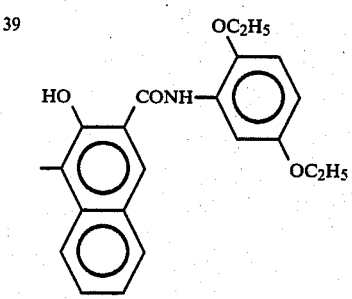 | 40 | 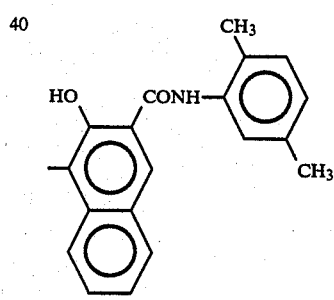 |

-continued
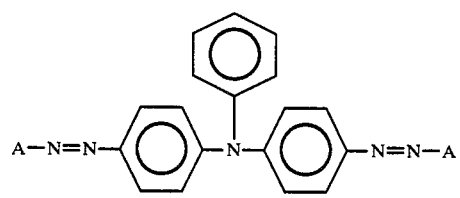
| Disazo Pigment No. | A | Disazo Pigment No. | A |
|---|---|---|---|
| 41 | 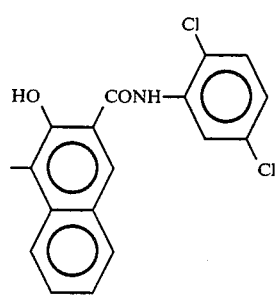 | 42 | 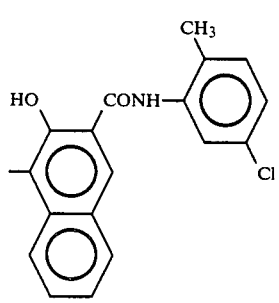 |
| 43 | 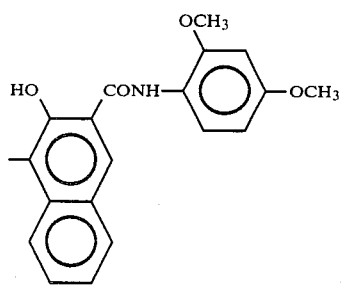 | 44 | 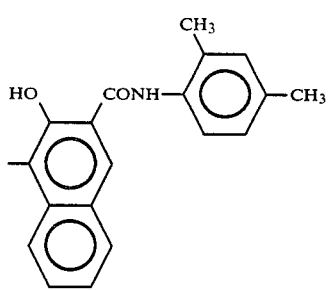 |
| 45 | 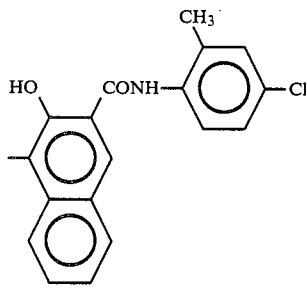 | 46 | 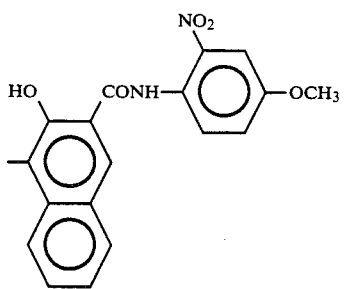 |
| 47 | 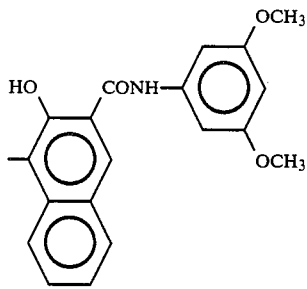 | 48 | 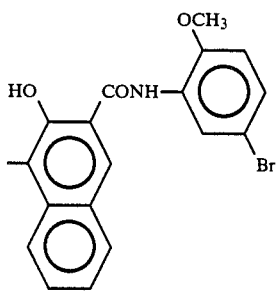 |

-continued
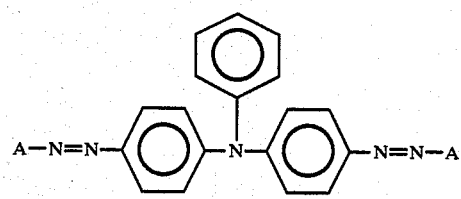
| Disazo Pigment No. | A | Disazo Pigment No. | A |
|---|---|---|---|
| 49 | 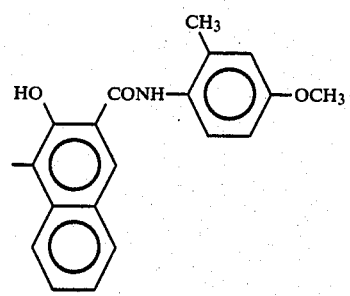 | 50 | 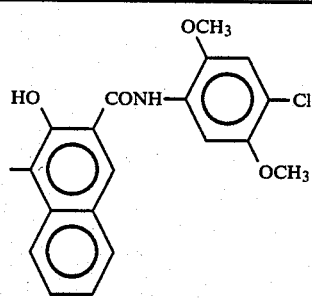 |
| 51 | 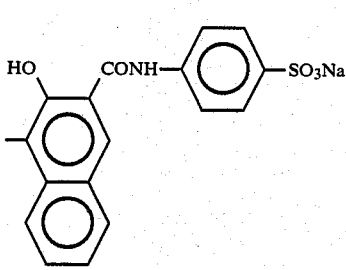 | 52 | 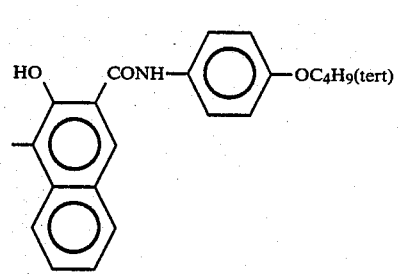 |
| 53 | 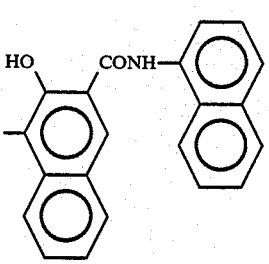 | 54 | 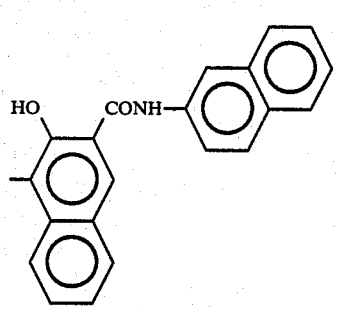 |
| 55 | 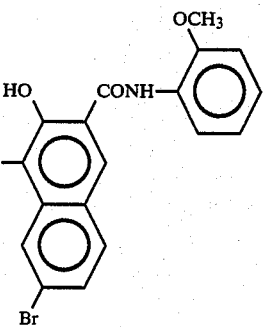 | 56 | 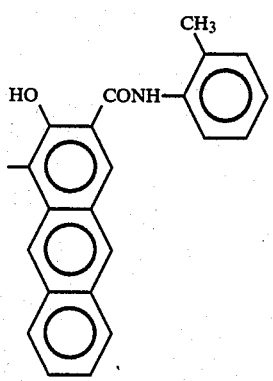 |

-continued
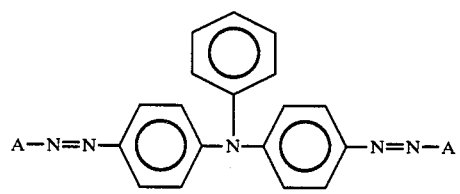
| Disazo Pigment No. | A | Disazo Pigment No. | A |
|---|---|---|---|
| 57 | 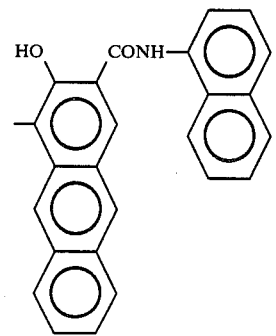 | 58 | 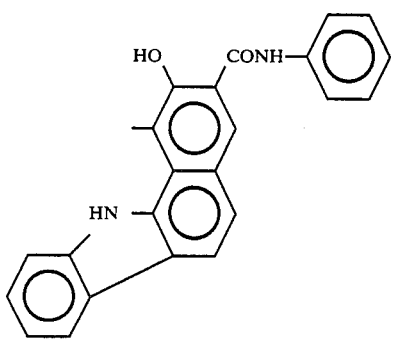 |
| 59 | 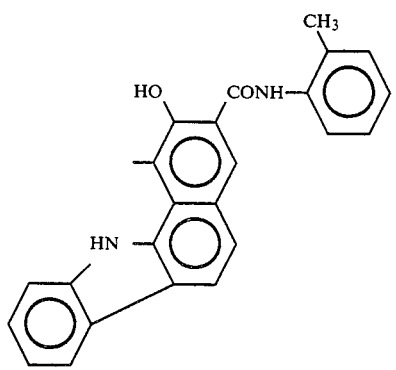 | 60 | 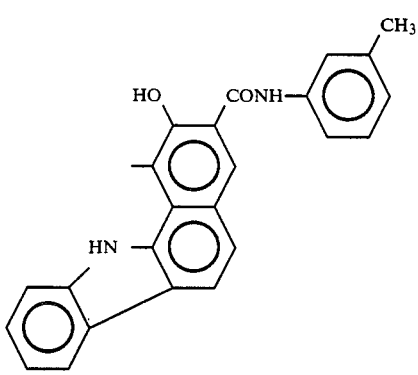 |
| 61 | 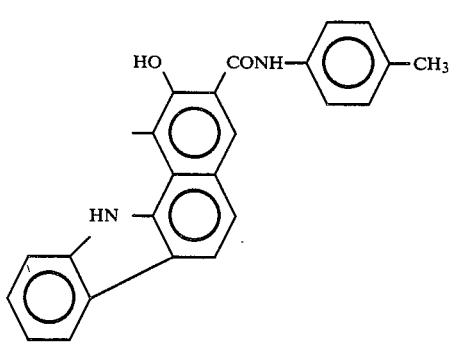 | 62 | 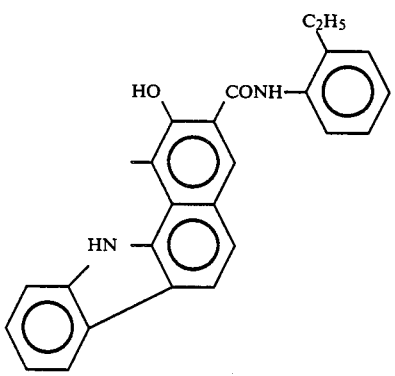 |

-continued

| Disazo Pigment No. | A | Disazo Pigment No. | A |
|---|---|---|---|
| 63 | 3-hydroxy-N-(4-ethylphenyl)-benzo[a]carbazole-2-carboxamide | 64 | 3-hydroxy-N-(2-methoxyphenyl)-benzo[a]carbazole-2-carboxamide |
| 65 | 3-hydroxy-N-(3-methoxyphenyl)-benzo[a]carbazole-2-carboxamide | 66 | 3-hydroxy-N-(4-methoxyphenyl)-benzo[a]carbazole-2-carboxamide |
| 67 | 3-hydroxy-N-(2-ethoxyphenyl)-benzo[a]carbazole-2-carboxamide | 68 | 3-hydroxy-N-(3-ethoxyphenyl)-benzo[a]carbazole-2-carboxamide |

-continued
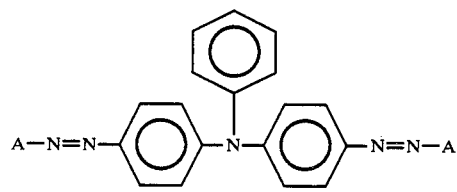
| Disazo Pigment No. | A | Disazo Pigment No. | A |
|---|---|---|---|
| 69 | 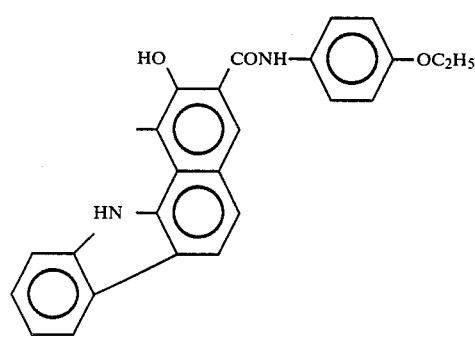 | 70 | 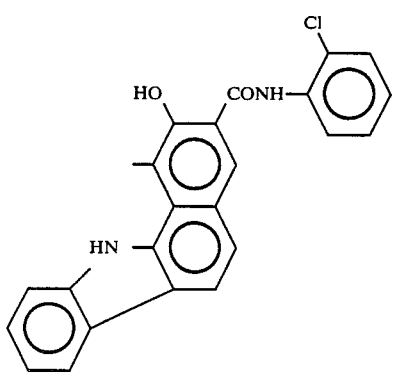 |
| 71 | 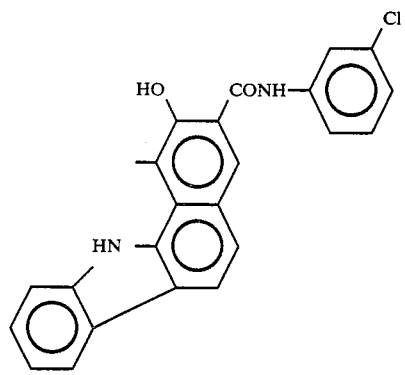 | 72 | 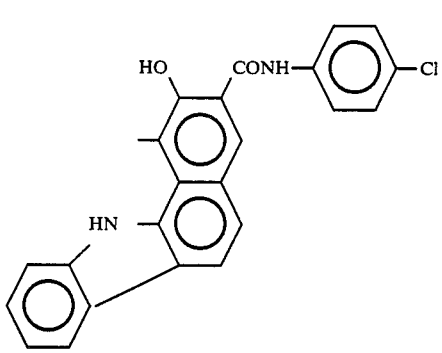 |
| 73 | 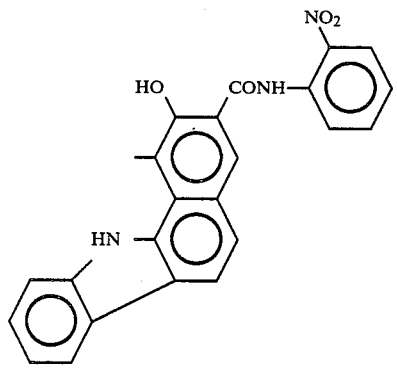 | 74 | 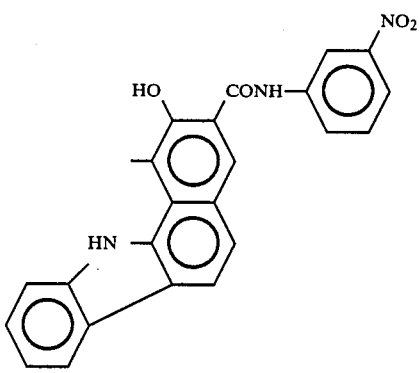 |

4,582,771
-continued
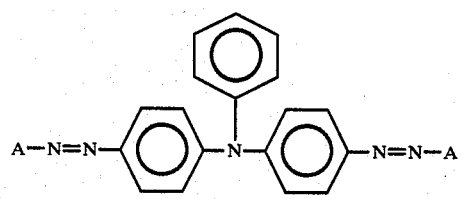
| Disazo Pigment No. | A | Disazo Pigment No. | A |
|---|---|---|---|
| 75 | 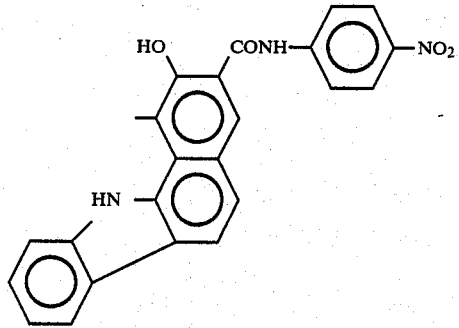 | 76 | 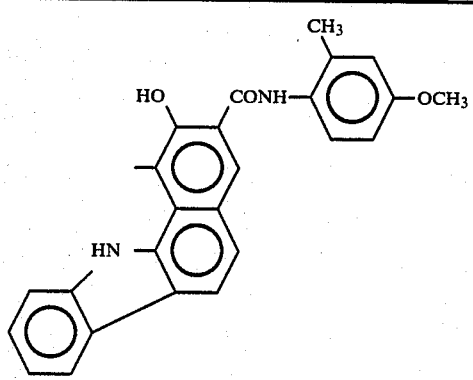 |
| 77 | 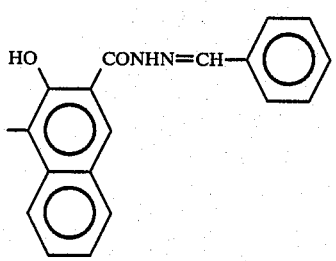 | 78 | 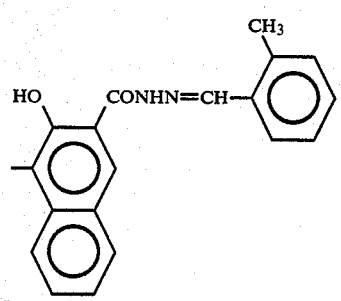 |
| 79 | 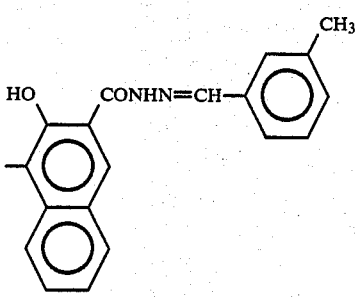 | 80 | 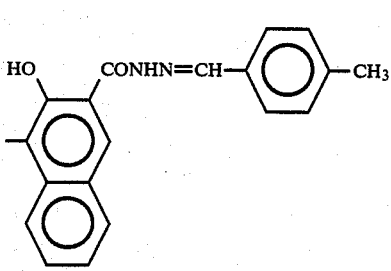 |
| 81 | 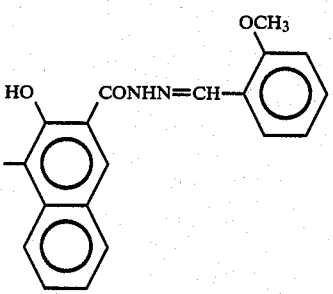 | 82 | 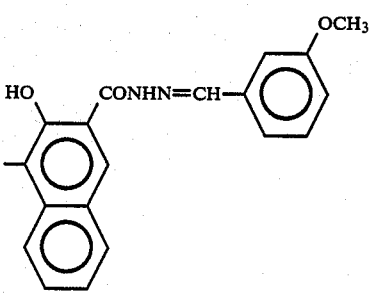 |

-continued
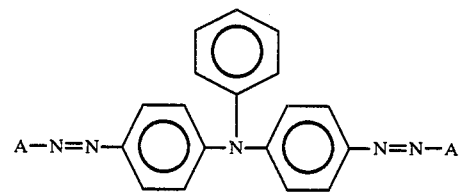
| Disazo Pigment No. | A | Disazo Pigment No. | A |
|---|---|---|---|
| 83 | 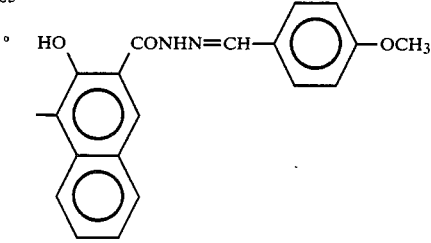 | 84 | 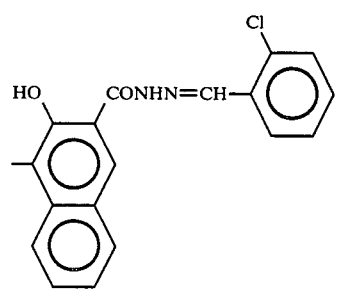 |
| 85 | 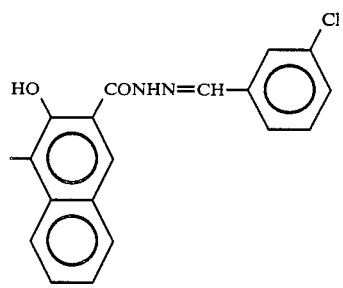 | 86 | 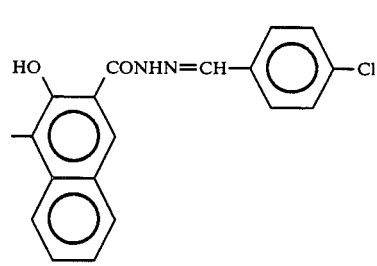 |
| 87 | 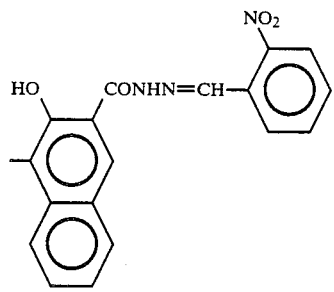 | 88 | 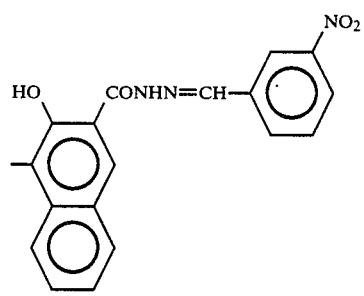 |
| 89 | 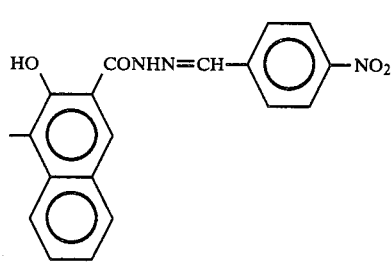 | 90 | 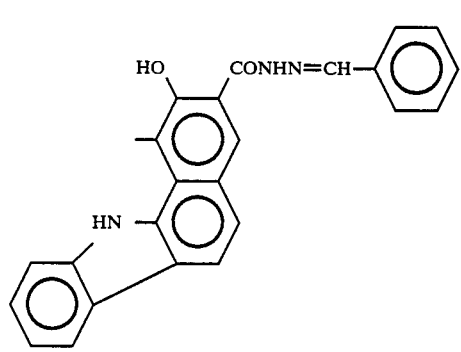 |

-continued

| Disazo Pigment No. | A | Disazo Pigment No. | A |
|---|---|---|---|
| 91 | 2-hydroxy-3-(N-phenylamino)naphthalene-carboxamide with N'=CH-(2-methylphenyl) | 92 | 2-hydroxy-3-(N-phenylamino)naphthalene-carboxamide with N'=CH-(3-methylphenyl) |
| 93 | 2-hydroxy-3-(N-phenylamino)naphthalene-carboxamide with N'=CH-(4-methylphenyl) | 94 | 2-hydroxy-3-(N-phenylamino)naphthalene-carboxamide with N'=CH-(2-methoxyphenyl) |
| 95 | 2-hydroxy-3-(N-phenylamino)naphthalene-carboxamide with N'=CH-(3-methoxyphenyl) | 96 | 2-hydroxy-3-(N-phenylamino)naphthalene-carboxamide with N'=CH-(4-methoxyphenyl) |

-continued
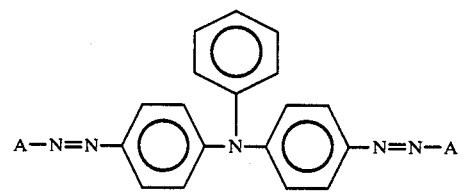
| Disazo Pigment No. | A | Disazo Pigment No. | A |
|---|---|---|---|
| 97 | 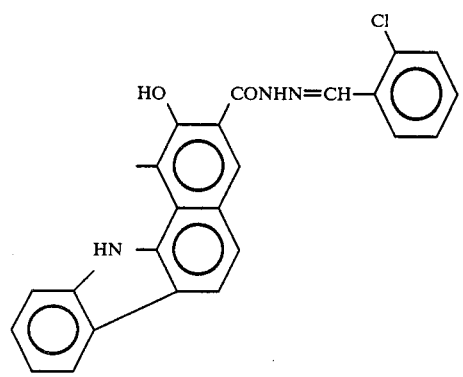 | 98 | 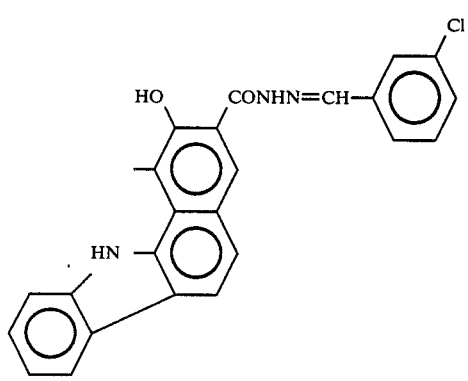 |
| 99 | 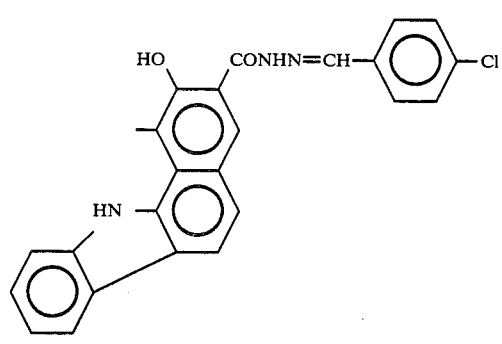 | 100 | 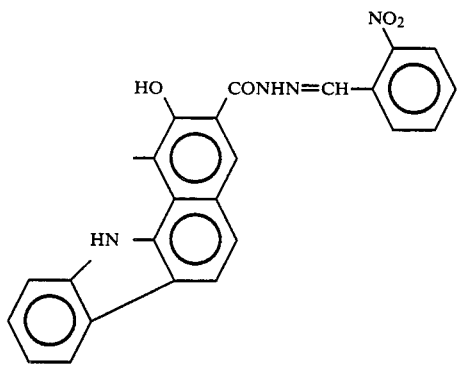 |
| 101 | 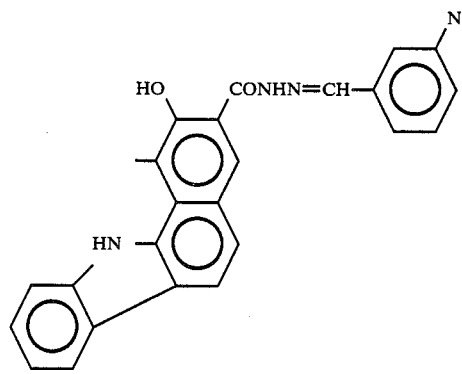 | 102 | 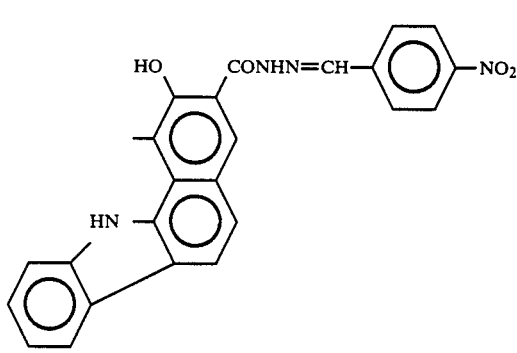 |

-continued
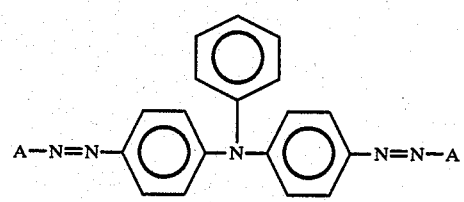
| Disazo Pigment No. | A | Disazo Pigment No. | A |
|---|---|---|---|
| 103 | 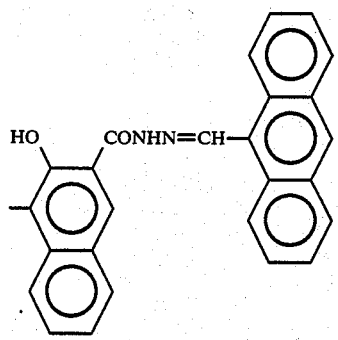 | 104 | 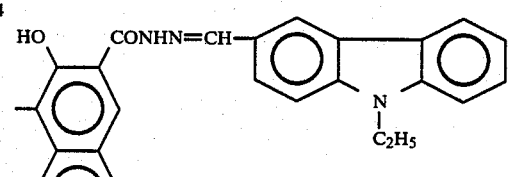 |
| 105 | 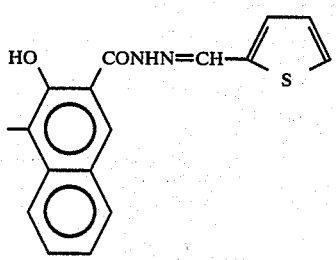 | 106 | 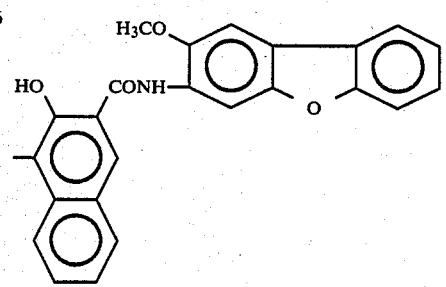 |
| 107 | 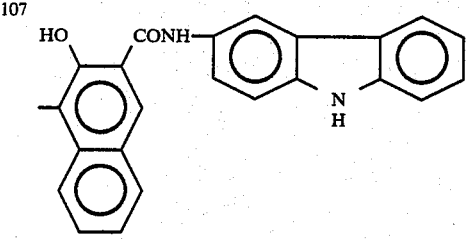 | 108 | 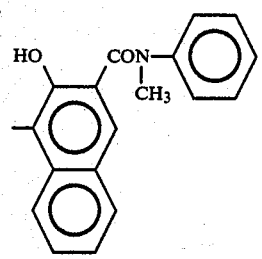 |
| 109 | 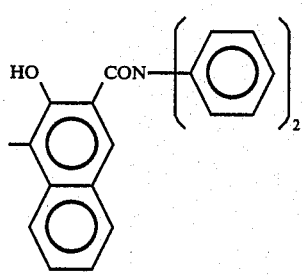 | 110 | 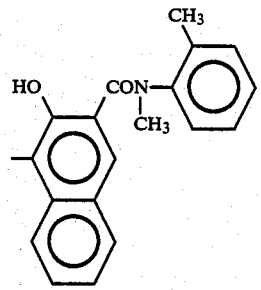 |

-continued
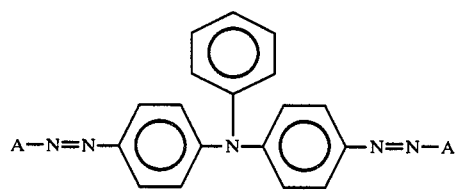
| Disazo Pigment No. | A | Disazo Pigment No. | A |
| --- | --- | --- | --- |
| 111 | 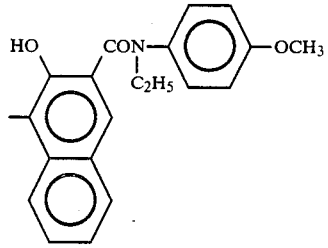 | 112 | 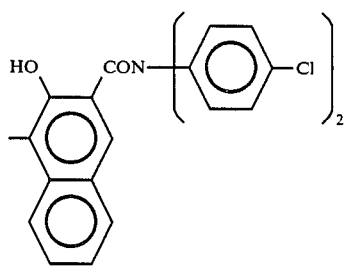 |
| 113 | 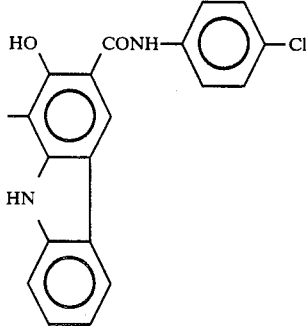 | 114 | 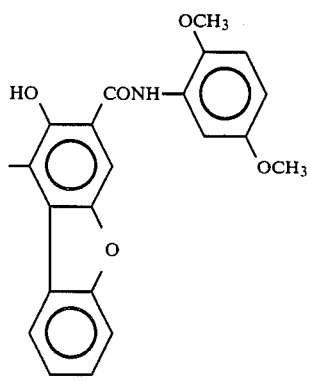 |
| 115 | 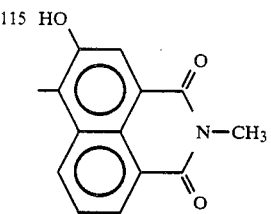 | 116 | 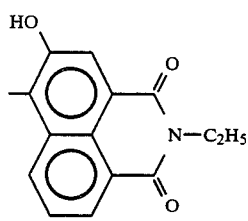 |
| 117 | 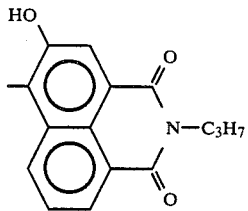 | 118 | 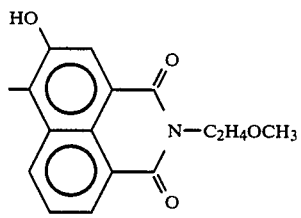 |
| 119 | 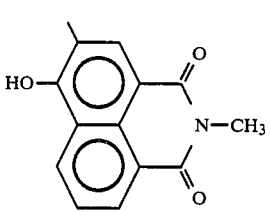 | 120 | 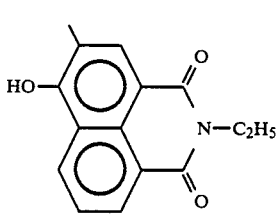 |

-continued
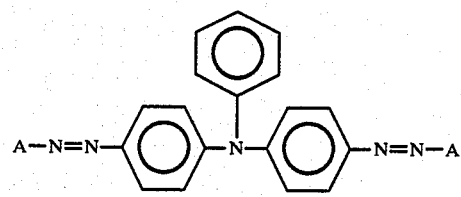
| Disazo Pigment No. | A | Disazo Pigment No. | A |
|---|---|---|---|
| 121 | 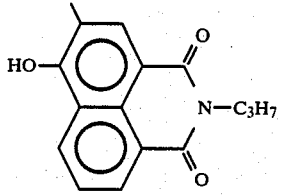 | 122 | 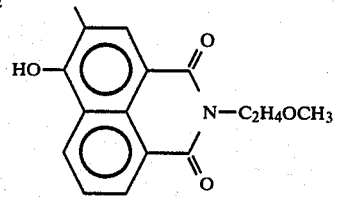 |
| 123 | 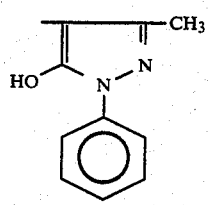 | 124 | 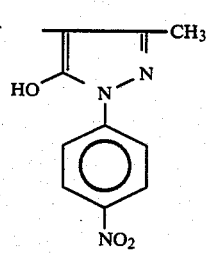 |
| 125 | 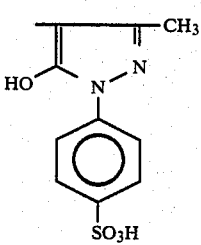 | 126 | 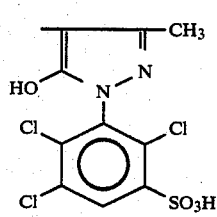 |
| 127 | 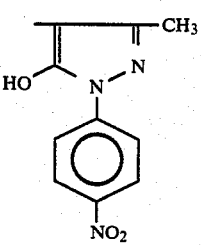 | 128 | 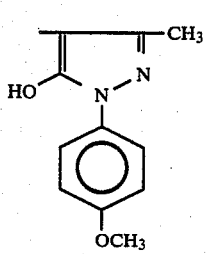 |
| 129 | 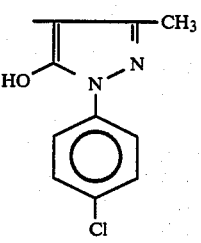 | 130 | 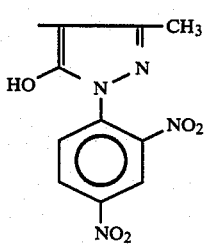 |

-continued
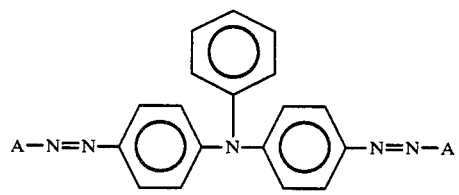
| Disazo Pigment No. | A | Disazo Pigment No. | A |
|---|---|---|---|
| 131 | 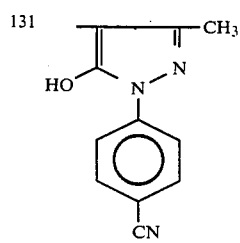 | 132 | 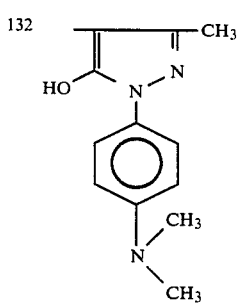 |
| 133 | 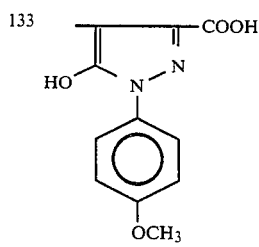 | 134 | 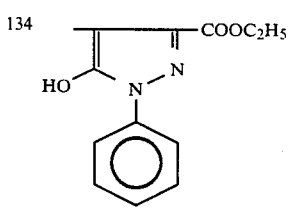 |
| 135 | 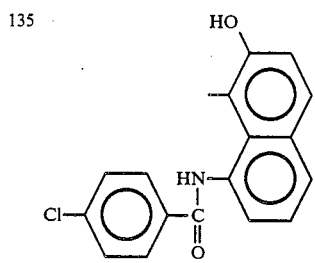 | 136 | 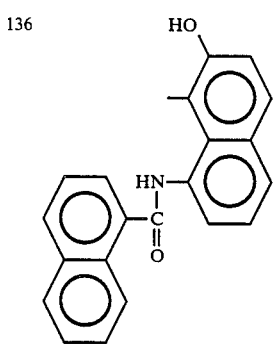 |
| 137 | 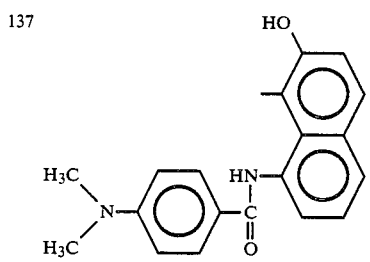 | 138 | 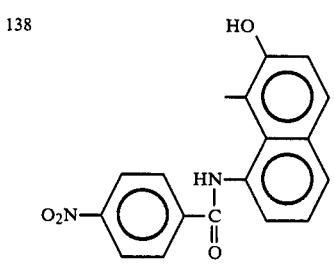 |

-continued
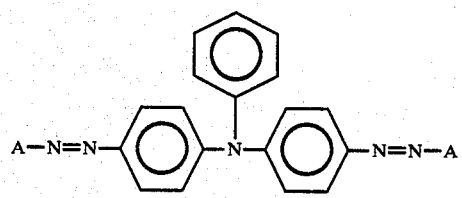
| Disazo Pigment No. | A | Disazo Pigment No. | A |
|---|---|---|---|
| 139 | 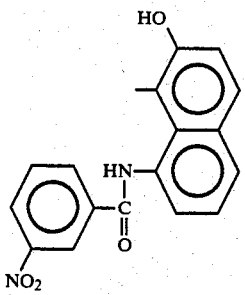 | 140 | 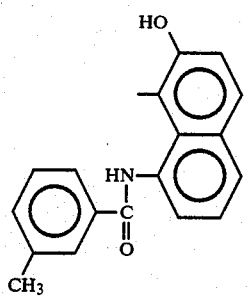 |
| 141 | 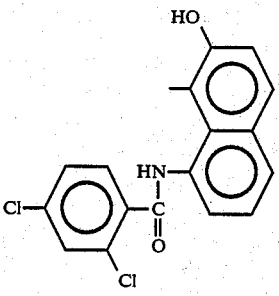 | 142 | 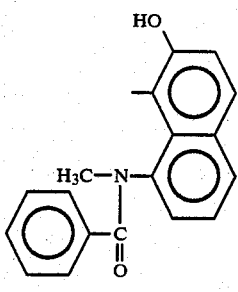 |
| 143 | 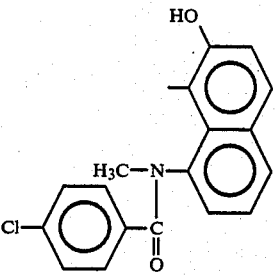 | 144 | 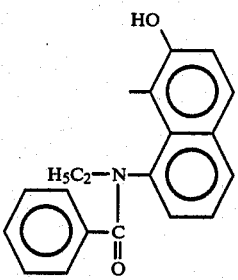 |
| 145 | 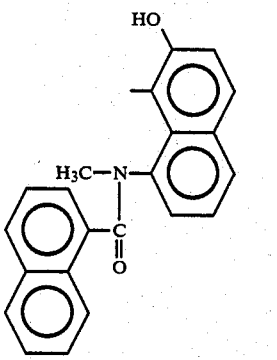 | 146 | 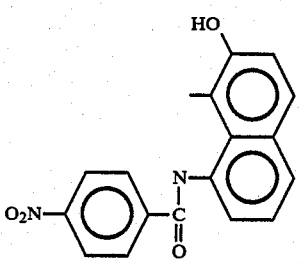 |

-continued
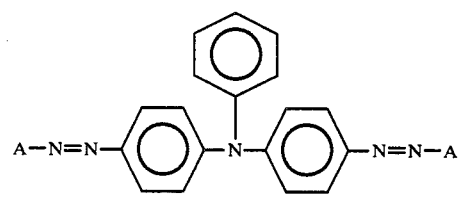
| Disazo Pigment No. | A | Disazo Pigment No. | A |
|---|---|---|---|
| 147 | 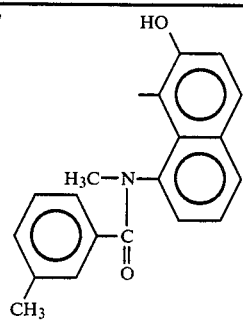 | 148 | 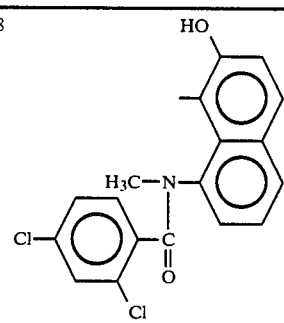 |
| 149 | 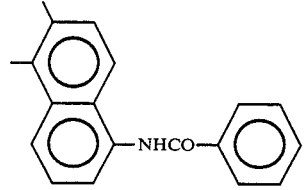 | 150 | 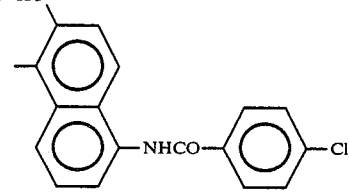 |
| 151 | 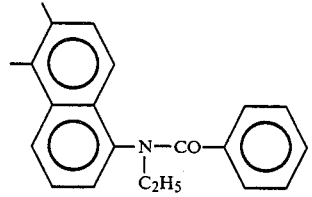 | 152 | 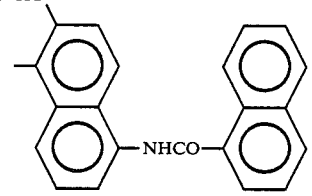 |
| 153 | 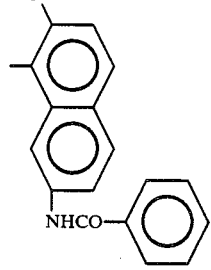 | 154 | 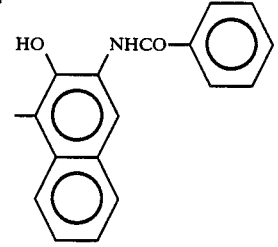 |
| 155 | 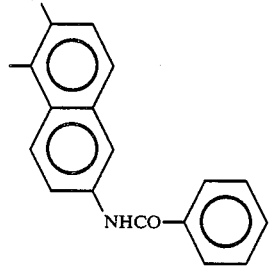 | 156 | 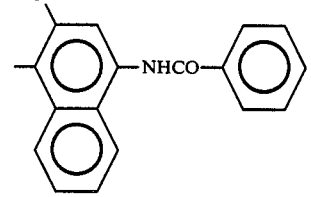 |

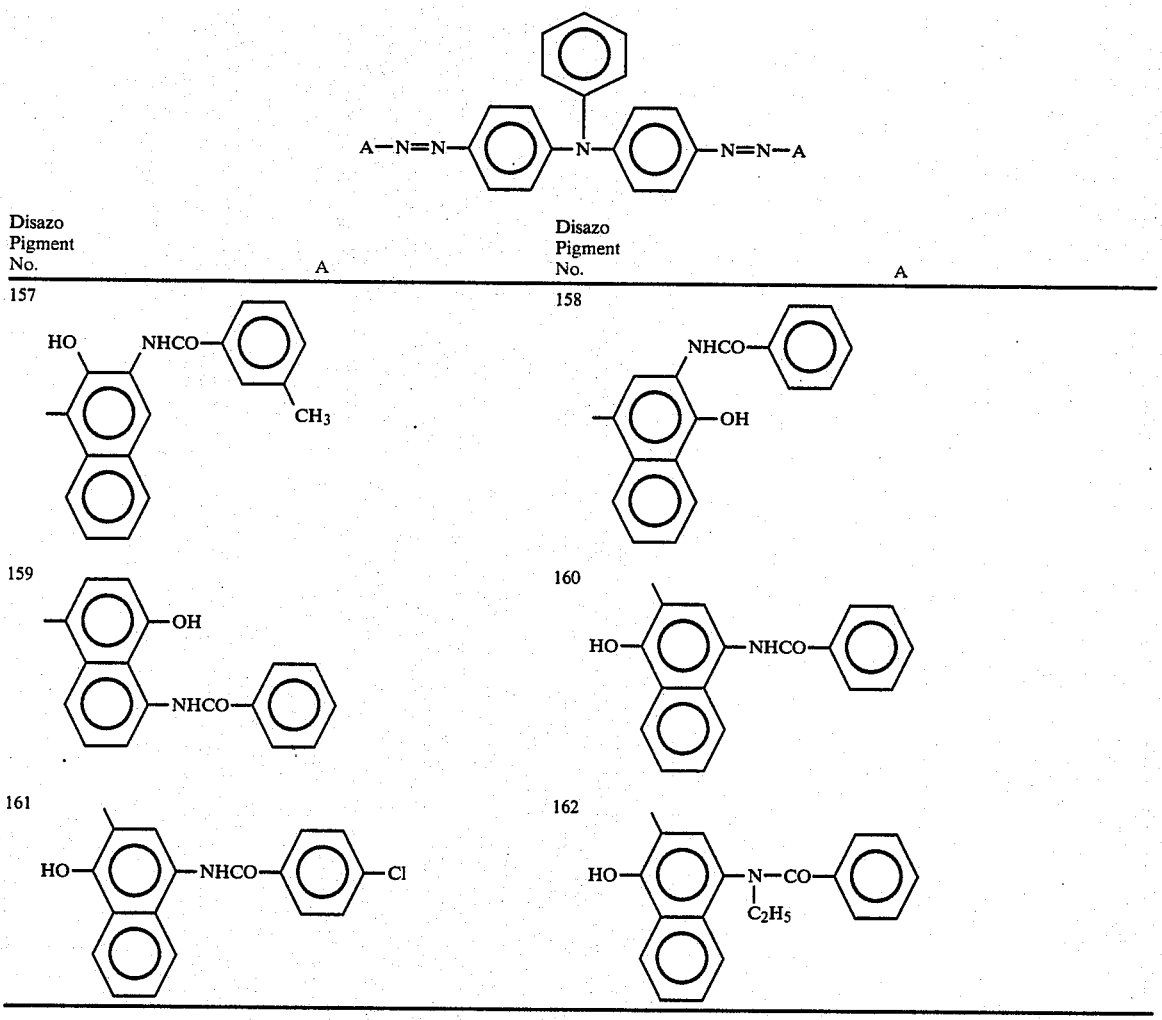

DESCRIPTION OF THE PREFERRED EMBODIMENTS

Figure 1:
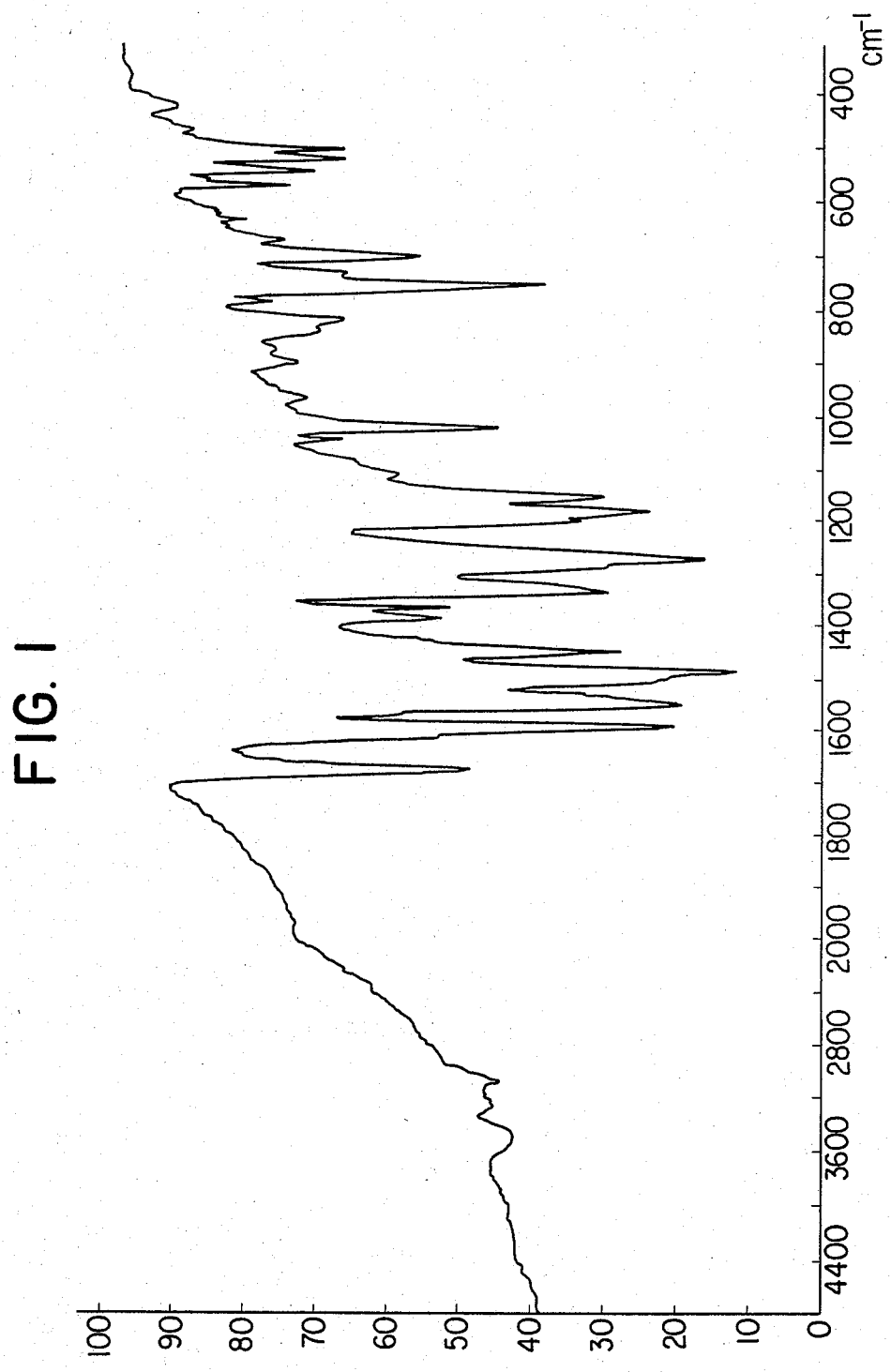
FIG. 1 shows the infrared absorption spectrum (KBr tablet method) of disazo pigment No. 1 used in the present invention.

As mentioned above, an electrophotographic element having a very high sensitivity can easily be prepared by using the disazo pigment of the present invention. Among them, disazo pigments Nos. 1, 16, 59, 60, 62, 64, 71 and 75 are particularly preferable as a charge generating material.

The above disazo compounds are prepared by diazotizing 4,4'-diaminotriphenyl amine as a starting material to form a tetrazonium salt thereof and effecting a coupling reaction with an appropriate coupler. 4,4'-diaminotriphenyl amine is prepared, for example, by a method disclosed in "Richarad Herz, Ber., 23, 2538".

The diazotization of 4,4'-diaminotriphenyl amine is carried out in a dilute inorganic acid such as dilute hydrochloric acid or dilute sulfuric acid by adding sodium nitrite aqueous solution at −10° C. to 10° C. This diazotization is completed in 30 minutes to 3 hours. To the reaction mixture, is added borofluoric acid, sodium borofluoride aqueous solution or the like to precipitate as a tetrazonium salt. The precipitated crystal is preferably filtered out to be used in a succeeding reaction. The tetrazonium salt thus obtained is subjected to a coupling reaction with a coupler having the general formula (VIII). In practice, this reaction is carried out by dissolving a mixture of the tetrazonium salt and coupler in an organic solvent such as N,N-dimethylformaldehyde (DMF), dimethylsulfoxide or the like, and adding dropwise an alkaline aqueous solution to the reaction solution such as sodium acetate aqueous solution at about −10° C. to 40° C. This reaction is completed in about 5 minutes to 3 hours. After the completion of the reaction, the precipitated crystal is filtered out and is finally purified by an appropriate method (for example by washing, recrystalizing or the like with water and/or organic solvent).

The preparation of disazocompound of the present invention is further illustrated by the following Examples.

PREPARATION EXAMPLE 1 (PREPARATION OF DISAZO COMPOUND NO. 1)

4,4'-diaminotriphenylamine 5.51 g was added to hydrochloric acid comprising water 10 ml and conc. hydrochloric acid 17 ml, and the mixture was stirred for 1 hour at room temperature. The resultant mixture was then cooled to $-2°$ C., and a solution obtained by adding sodium nitrite 3.31 g to water 12 ml was added drop-wise to the cooled mixture at a temperature of $-2°$ C. to $1°$ C. for 30 minutes.

Thereafter, the resultant mixture was stirred at the same temperature for 1 hour and half, and undissolved portion (minute amount) was removed from the system. To this reaction liquor, was added 42% borofluoric acid 20 ml, and the mixture was cooled to stand. The produced red-orange colored needle-like crystal was filtered out, and was washed with ethanol. The washed crystal was dried, thus producing tetrazonium difluoroborate 8.55 g(yield=90.3%). According to an infrared absorption spectrum (KBr Tablet Method), an absorption band on the basis of $N_2^+$ was recognized at 2230 cm$^{-1}$.

0.95 g of the tetrazonium salt thus obtained and 1.26 g of 2-hydroxy-3-naphthoic acid anilide as a coupler were dissolved in cooled 230 ml of N,N-dimethylformamide. To this solution, was added drop-wise a solution comprising sodium acetate 0.66 g and water 10 ml at a temperature of 17°-21° C. for 5 minutes. Thereafter, the resultant mixture was stirred for 3 hours at room temperature. The produced precipitate was filtered out, and was washed with N,N-dimethylformamide 300 ml for 5 times and further with water 300 ml for 2 times. The washed precipitate was dried at 80° C. under a reduced pressure of 2 mm Hg, thus obtaining 1.11 g (yield=67.4%) of the above disazo compound No. 1.

Various properties of the disazo compound No. 1 thus obtained were as follows:

| Melting Point: 300° C. or higher | | | |
|---|---|---|---|
| Elementary Analysis: | C | H | N |
| Measured Value | 75.57 | 4.70 | 11.76 |
| Calculated Value | 75.80 | 4.53 | 11.90 |

The infrared absorption spectrum (KBr Tablet Method) of this compound is shown in FIG. 1.

PREPARATION EXAMPLES 2 TO 16

The same procedure as in the above Example 1 was repeated, except that compounds as mentioned in Table 1 were used as a coupler, and the disazo compounds thus obtained are shown in Table 1. Absorption of $\nu_{c=o}$(amide I) of infrared absorption spectrum (KBr Tablet Method), melting point and elementary analysis values with regard to the disazo compounds obtained are also shown in Table 1.

TABLE 1

| Preparation Ex. No. | Disazo Compound No. | Coupler | $\nu_{c=o}$(cm$^{-1}$) (Amide I) | Melting Point | C Measured Value (Calculated Value) | H Measured Value (Calculated Value) | N Measured Value (Calculated Value) |
|---|---|---|---|---|---|---|---|
| 2 | 10 | 2-hydroxy-3-naphthoyl-CONH-C6H4-OCH3 | 1670 | more than 300° C. | 73.24 (73.37) | 4.58 (4.68) | 11.06 (11.09) |
| 3 | 4 | 2-hydroxy-3-naphthoyl-CONH-C6H4-CH3 | 1670 | more than 300° C. | 76.11 (76.12) | 4.72 (4.85) | 11.34 (11.51) |
| 4 | 16 | 2-hydroxy-3-naphthoyl-CONH-C6H4-Cl | 1670 | more than 300° C. | 69.67 (69.95) | 3.88 (3.95) | 10.72 (10.98) |
| 5 | 33 | 2-hydroxy-3-naphthoyl-CONH-C6H4-NO2 | 1680 | 290° C. (Decomposition) | 68.66 (68.34) | 3.82 (3.86) | 13.89 (13.79) |
| 6 | 62 | carbazole-HO-CONH-C6H4-C2H5 | 1680 | 294° C. (Decomposition) | 77.45 (77.18) | 4.65 (4.86) | 11.66 (11.91) |
| 7 | 66 | carbazole-HO-CONH-C6H4-OCH3 | 1670 | more than 300° C. | 74.36 (74.63) | 4.49 (4.46) | 11.72 (11.87) |

TABLE 1-continued

| Preparation Ex. No. | Disazo Compound No. | Coupler | $\nu_{c=o}(cm^{-1})$ (Amide I) | Melting Point | Elementary Analysis (%) | | |
|---|---|---|---|---|---|---|---|
| | | | | | C Measured Value (Calculated Value) | H Measured Value (Calculated Value) | N Measured Value (Calculated Value) |
| 8 | 65 | [structure with OCH₃, para] | 1675 | more than 300° C. | 74.34 (74.63) | 4.29 (4.46) | 11.57 (11.87) |
| 9 | 64 | [structure with OCH₃, ortho] | 1670 | more than 300° C. | 74.99 (74.63) | 4.09 (4.46) | 11.55 (11.87) |
| 10 | 70 | [structure with Cl, ortho] | 1680 | more than 300° C. | 71.60 (71.77) | 3.67 (3.86) | 11.75 (11.77) |
| 11 | 71 | [structure with Cl, meta] | 1680 | more than 300° C. | 71.90 (71.77) | 3.99 (3.86) | 11.79 (11.77) |
| 12 | 59 | [structure with CH₃, ortho] | 1680 | more than 300° C. | 76.63 (76.95) | 4.43 (4.60) | 11.96 (12.24) |
| 13 | 60 | [structure with CH₃, meta] | 1680 | more than 300° C. | 76.75 (76.95) | 4.48 (4.60) | 12.00 (12.24) |
| 14 | 61 | [structure with CH₃, para] | 1670 | more than 300° C. | 76.91 (76.95) | 4.35 (4.60) | 12.04 (12.24) |
| 15 | 74 | [structure with NO₂, meta] | 1680 | more than 300° C. | 70.07 (70.39) | 3.59 (3.78) | 13.85 (14.11) |
| 16 | 75 | [structure with NO₂, para] | 1680 | more than 300° C. | 69.95 (70.39) | 3.52 (3.78) | 13.74 (14.11) |

Figure 2:
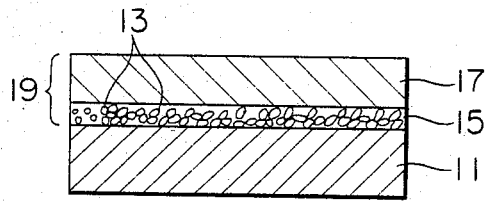
FIGS. 2 and 3 are enlarged sectional views illustrating the structures of the electrophotographic elements of the present invention.
Figure 3:
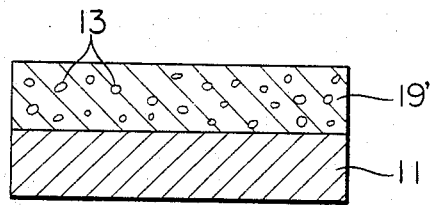

The disazo pigment of the present invention is used as a charge generating material in a photosensitive layer of an electrophotographic element. FIGS. 2 and 3 illustrate a typical structure of the electrophotographic element.

The electrophotographic element of FIG. 2 comprises a laminated type photosensitive layer 19 on an electroconductive substrate 11, said photosensitive layer 19 comprising a charge generating layer 15 containing disazo pigment 13 as the main component and a charge transfer layer 17 containing charge transfer material as the main component.

In the electrophotographic element of FIG. 2, exposed light passes through a charge transfer layer to a charge generating layer 15 wherein charge is generated in disazo pigment 13. The charge thus generated is transferred by the charge transfer layer 17. Thus, the generation of charge necessary for light decay is effected in disazo pigment 13, and the transfer of the generated charge is effected by the charge transfer layer 17.

The electrophotographic element shown in FIG. 3 is composed of a photosensitive layer 19' on an electroconductive substrate 11, the photosensitive layer 19' comprising essentially of disazo pigment 13, charge transfer material and insulative binder. The disazo pigment 13 is a charge generating material.

It is possible to modify the basic structure of the electrophotographic element of FIG. 2, for example, by applying the charge generating layer and the charge transfer layer in reverse order.

The thickness of the charge generating layer 15 of the photosensitive layer of FIG. 2 is preferably 0.01–5μ, more preferably 0.05–2μ. If this thickness is less than 0.01μ, the generation of charge is not satisfactory. On the other hand, if this thickness is more than 5μ, the residual potential becomes too high for practical use.

The thickness of the charge transfer layer 17 is preferably 3–50μ, more preferably 5–30μ. If this thickness is less than 3μ, a charged amount is insufficient. On the other hand, if this thickness is more than 50μ, the residual potential becomes too high for practical use.

The charge generating layer 15 contains disazo pigment expressed by the above general formula as the main component, and further binder, plasticizer and the like. The amount of disazo pigment in the charge generating layer is more than 30% by weight, more preferably 50% by weight.

The charge transfer layer 17 contains charge transfer material and binder as the main components and further plasticizer and the like. The amount of the charge transfer material in the charge transfer layer is 10–95% by weight, preferably 30–90% by weight. If the amount of the charge transfer material is less than 10% by weight, the transfer of the charge is not substantially carried out. On the other hand, if this amount is more than 95% by weight, the mechanical strength of the photosensitive film is too poor for practical use.

The photosensitive layer 19' of the photosensitive element of FIG. 3 is preferably 3–50μ, more preferably 5–30μ. The amount of the disazo pigment in the photosensitive layer 19' is preferably less than 50% by weight, more preferably less than 20% by weight, and the amount of the charge transfer material is preferably 10–95% by weight, more preferably 30–90% by weight.

The essential feature of the present invention resides in the use of specific disazo pigments as expressed by the above general formula I, and other components such as electroconductive substrate, charge transfer material and the like are the same as the conventionally known materials. Examples of these materials are illustrated hereinafter.

Examples of the electroconductive substrate used in the electrophotographic element of the present invention include: metallic plates such as aluminum, copper, zinc and the like; plastic sheets such as polyester and the like; plastic film composite obtained by vapor depositing electroconductive materials such as aluminum, SnO2 and the like; or electroconductively treated paper and the like.

Examples of binders include: condensation type resins such as polyamide, polyurethane, polyester, epoxy resin, phenoxy resin, polyketone, polycarbonate and the like; vinyl polymers such as polyvinyl ketone, polystyrene, poly-N-vinyl carbazole, polyacrylamide, and the like. Any resin can be used if it is insulative and adhesive.

Examples of plasticizers include halogenated paraffin, polybiphenylchloride, dimethylnaphthalene, dibutyl phthalate and the like. Silicone oil may also be added to improve surface properties of the photosensitive material.

The charge transfer material includes a positive hole transfer material and an electron transfer material. Examples of the hole transfer material include compounds as expressed by the following general formula (1) to (11).

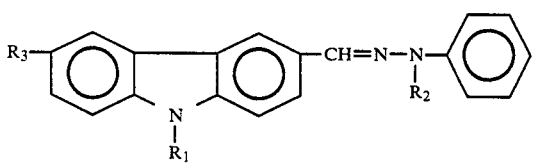
(1)

(wherein $R_1$ represents methyl, ethyl, 2-hydroxyethyl or 2-chloroethyl; $R_2$ represents methyl, ethyl, benzyl or phenyl; and $R_3$ represents hydrogen, chlorine, bromine, alkyl having 1 to 4 carbon atoms, alkoxy having 1 to 4 carbon atoms, dialkylamino or nitro.)

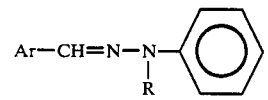
(2)

(wherein Ar represents naphthalene ring, anthracene ring, styryl and their substituents or pyridine ring furan ring, or thiophene ring; and R represents alkyl or benzyl.)

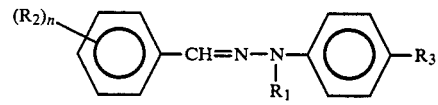
(3)

(wherein $R_1$ represents alkyl, benzyl or phenyl; $R_2$ represents hydrogen, alkyl having 1 to 3 carbon atoms, alkoxy having 1 to 3 carbon atoms, dialkylamino, diaralkylamino or diarylamino; n represents an integer of 1 to 4; when n is 2 or more, $R_2$ may be the same or different; and $R_3$ represents hydrogen or methoxy.)

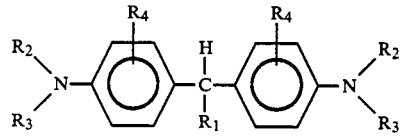
(4)

(wherein $R_1$ represents alkyl having 1 to 11 carbon atoms, substituted or non-substituted phenyl or heterocyclic group; $R_2$ and $R_3$ may be the same or different and represent hydrogen, alkyl having 1 to 4 carbon atoms, hydroxyalkyl, chloroalkyl, substituted or non-substituted aralkyl; $R_2$ and $R_3$ may be bonded with each other to form a heterocyclic ring containing nitrogen; $R_4$ may be the same or different and represent hydrogen, alkyl having 1 to 4 carbon atoms, alkoxy or halogen.)

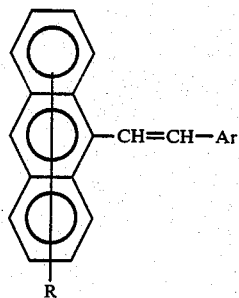
(5)

(wherein R represents hydrogen or a halogen atom; and Ar represents substituted or non-substituted phenyl, naphthyl, anthryl or carbazolyl.)

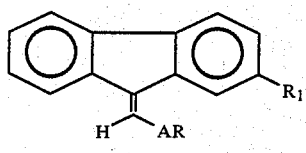
(6)

(wherein $R_1$ represents hydrogen, halogen, cyano, alkoxy having 1 to 4 carbon atoms or alkyl having 1 to 4 carbon atoms; Ar represents

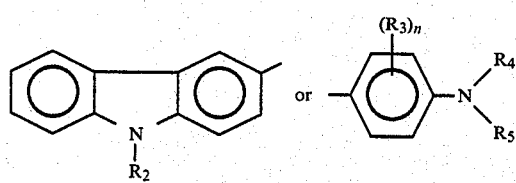

wherein $R_2$ represents alkyl having 1 to 4 carbon atoms, $R_3$ represents hydrogen, halogen, alkyl having 1 to 4 carbon atoms, alkoxy having 1 to 4 carbon atoms or dialkyl amino, n is an integer of 1 or 2; when n is 2, $R_3$ may be the same or different; $R_4$ and $R_5$ represent hydrogen, substituted or non-substituted alkyl having 1 to 4 carbon atoms or substituted or non-substituted benzyl group.)

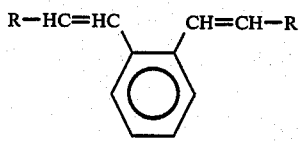
(7)

(wherein R represents carbazolyl, pyridyl, thienyl, indolyl, furyl, or substituted or non-substituted phenyl, styryl, naphthyl or anthryl group; these substituents are selected from the group of dialkylamino, alkyl, alkoxy, carboxyl or its ester, halogen atom, cyano, aralkylamino, N-alkyl-N-aralkylamino, amino, nitro and acetyl amino groups.)

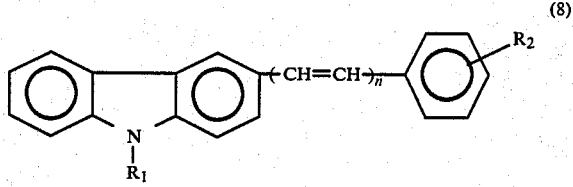
(8)

(wherein $R_1$ represents a lower alkyl or benzyl group; $R_2$ represents hydrogen, lower alkyl, lower alkoxy, halogen, nitro, amino, or amino group substituted with lower alkyl or benzyl; and n is an integer of 1 or 2.)

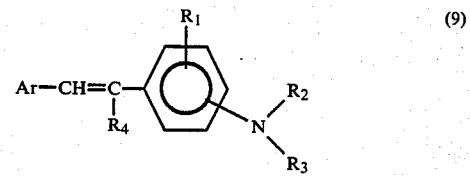
(9)

(wherein $R_1$ represents hydrogen, alkyl, alkoxy or halogen; $R_2$ and $R_3$ represent alkyl, substituted or non-substituted aralkyl, or substituted or non-substituted aryl group; $R_4$ represents hydrogen or substituted or non-substituted phenyl; and Ar represents phenyl or naphthyl group.)

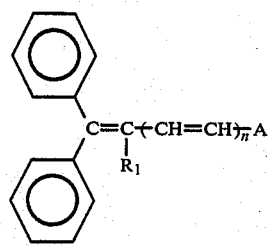
(10)

(wherein n is an integer of 0 or 1; $R_1$ represents hydrogen, alkyl or substituted or non-substituted phenyl; A represents

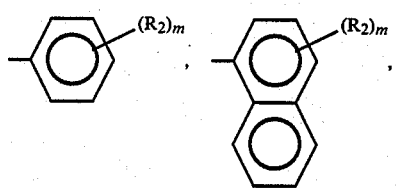

9-anthryl, or substituted or non-substituted N-alkylcarbazolyl group, wherein $R_2$ represents hydrogen, alkyl, alkoxy, halogen or

wherein $R_3$ and $R_4$ represent alkyl, substituted or non-substituted aralkyl, or substituted or non-substituted aryl group, and $R_3$ and $R_4$ may form a ring; and m is an integer of 0, 1, 2 or 3, when m is 2, $R_2$ may be the same or different.)

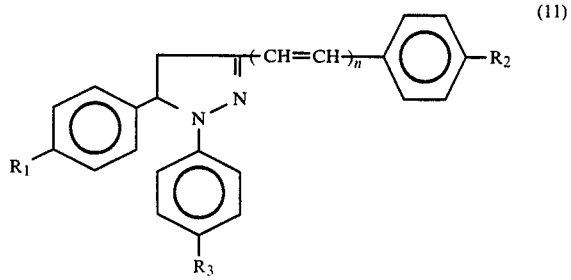

(11)

(wherein $R_1$, $R_2$ and $R_3$ are hydrogen, lower alkyl, lower alkoxy, dialkylamino, or halogen; and n is 0 or 1.)

Examples of the compound expressed by the general formula (1) include:
9-ethylcarbazole-3-aldehyde-1-methyl-1-phenylhydrazone,
9-ethylcarbazole-3-aldehyde-1-benzyl-1-phenylhydrazone,
9-ethylcarbazole-3-aldehyde 1,1-diphenylhydrazone, and the like.

Examples of the compound expressed by the general formula (2) include:
4-diethylaminostyrene-β-aldehyde-1-methyl-1-phenylhydrazone,
4-methoxynaphthalene-1-aldehyde-1-benzyl-1-phenylhydrazone, and the like.

Examples of the compound expressed by the general formula (3) include: 4-methoxybenzaldehyde 1-methyl-1-phenylhydrazone, 2,4-dimethoxybenzaldehyde 1-benzyl-1-phenylhydrazone,
4-diethylaminobenzaldehyde 1,1-diphenylhydrazone,
4-methoxybenzaldehyde 1-benzyl-1-(4-methoxy)phenyl hydrazone, 4-diphenylaminobenzaldehyde-1-benzyl-1-phenylhydrazone,
4-dibenzylaminobenzaldehyde 1,1-diphenylhydrazone and the like.

Examples of the compound expressed by the general formula (4) include:
1,1-bis(4-dibenzylaminophenyl)propane,
tris(4-diethylaminophenyl)methane,
1,1-bis(4-dibenzylaminophenyl)propane,
2,2'-dimethyl-4,4'-bis(diethylamino)-triphenylmethane and the like.

Examples of the compound expressed by the general formula (5) include:
9-(4-diethylaminostyryl)anthracene,
9-bromo-10-(4-diethylaminostyryl)anthracene, and the like.

Examples of the compound expressed by the general formula (6) include:
9-(4-dimethylaminobenzylidene)fluorene,
3-(9-fluorenylidene)-9-ethylcarbazole, and the like.

Examples of the compound expressed by the general formula (7) include:
1,2-bis(4-diethylaminostyryl)benzene,
1,2-bis(2,4-dimethoxystyryl)benzene and the like.

Examples of the compound expressed by the general formula (8) include:
3-styryl-9-ethylcarbazole,
3-(4-methoxystyryl)-9-ethylcarbazole, and the like.

Examples of the compound expressed by the general formula (9) include: 4-diphenylaminostilbene, 4-dibenzylaminostilbene, 4-ditolylaminostilbene, 1-(4-diphenylaminostyryl)naphthalene,
1-(4-diethylaminostyryl)naphthalene, and the like..

Examples of the compound expressed by the general formula (10) include:
4'-diphenylamino-alpha-phenylstilbene,
4'-methylphenylamino-alpha-phenylstilbene, and the like.

Examples of the compound expressed by the general formula (11) include:
1-phenyl-3-(4-diethylaminostyryl)-5-(4-diethylaminophenyl)pyrazoline,
1-phenyl-3-(4-dimethylaminostyryl)-5-(4-dimethylaminophenyl)pyrazoline, and the like.

Other examples of positive hole transfer material include: oxadiazole compounds such as
2,5-bis(4-diethylaminophenyl)-1,3,4-oxadiazole,
2,5-bis(4-(4-diethylaminostyryl)phenyl)-1,3,4-oxadiazole,
2-(9-ethylcarbazolyl-3-)-5-(4-diethylaminophenyl)-1,3,4-oxadiazole, and the like;
low molecular oxazole compounds such as 2-vinyl-4-(2-chlorophenyl)-5-(4-diethylaminophenyl)-oxazole, 2-(4-diethylaminophenyl)-4-phenyloxazole, and the like; and
high molecular compounds such as poly-N-vinyl carbazole, halogenated poly-N-vinyl carbazole, polyvinyl pyrene, polyvinyl anthracene, pyrene formaldehyde resin, ethylcarbazole formaldehyde resin, and the like.

Examples of electron transfer material include: chloroanil, bromoanil, tetracyanoethylene, tetracyanoquinonedimethane,
2,4,7-trinitro-9-fluorenone,
2,4,5,7-tetranitro-9-fluorenone,
2,4,5,7-tetranitro-xanthone,
2,4,8-trinitrothioxanthone,
2,6,8-trinitro-4H-indeno(1,2-b)thiophene-4-on,
1,3,7-trinitrodibenzothiophene-5,5-dioxide, and the like.

These charge transfer materials are used alone or in the form of a mixture of two or more.

With regard to the electrophotographic elements as prepared above, as adhesive layer or barrier layer may optionally be applied between an electroconductive substrate and a photosensitive layer. Examples of these layers include polyamide, nitrocellulose, aluminum oxide and the like. The thickness of the layer is preferably not more than 1μ.

The electrophotographic element as shown in FIG. 2 is prepared by vapor-depositing disazo pigment on an electroconductive substrate in accordance with vacuum vapor depositing method as disclosed in U.S. Pat. Nos. 3,973,959 and 3,996,049 or coating and drying on an electroconductive substrate a dispersion of disazo pigment particles in an appropriate solvent optionally having a binder dissolved; and then coating and drying a solution containing charge transfer material and binder on the charge generating layer, the surface of which may optionally be subjected to a buff polishing as disclosed in Japanese Patent Laid Opent No. 51-90827, or the thickness of which may be regulated.

The electrophotographic element as shown in FIG. 3 is prepared by dispersing disazo pigment particles in a solution having charge transfer material and binder dissolved, coating the dispersion on an electroconductive substrate and drying. In any case, disazo pigment used in the present invention is powdered by a ball mill or the like to a particle size of not more than 5μ, preferably not more than 2 u. Coating can be effected by ordinary method by means of doctor blade, dipping, wire bar and the like.

Copying by the electrophotographic element of the present invention can be effected by developing after charging and exposing the photosensitive layer surface and, if necessary, transferring the developed image to paper and the like.

As clearly seen from the above description and the following Examples, the electrophotographic element of the present invention using disazo pigment having the triphenylamine structure as a charge generating material can be easily produced and has a high sensitivity in comparison with the conventional electrophotographic elements. In addition to these advantages, performances of the electrophotographic element of the present invention are stable even if it is repeatedly used a great number of times.

The present invention is further illustrated by the following Examples, but the present invention should not be limited thereto.

EXAMPLE 1

76 parts by weight of disazo pigment NO. 75, 1260 parts by weight of tetrahydrofuran solution (solid content=2%) of polyester resin ("Byron 200" manufactured by Toyo Boseki Ltd.), and 3700 parts by weight of tetrahydrofuran are powdered and mixed in a ball mill. The dispersion thus obtained was coated on an aluminum surface of an aluminum-deposited polyester base (electroconductive substrate) by a doctor blade, and the coated film was allowed to stand for drying, thereby forming a charge generating layer having a thickness of about 1 μm.

On this charge generating layer, was coated a solution prepared by dissolving and mixing 2 parts by weight of 9-ethylcarbazole-3-aldehyde 1-methyl-1-phenylhydrazone, 2 parts by weight of polycarbonate resin ("Panlight K-1300" manufactured by Teijin Co. Ltd.) and 16 parts by weight of tetrahydrofuran by a doctor blade, and the coated film was dried at 80° C. for 2 minutes and 105° C. for 5 minutes, thereby forming a charge transfer layer having a thickness of about 18 μm. The laminated type electrophotographic element No. 1 thus prepared is shown in FIG. 2.

EXAMPLES 2 TO 5

Electrophotographic elements Nos. 2 to 5 were prepared in the same manner as in Example 1, except that disazo pigments as shown in the following Table 2 were used in place of disazo pigment No. 75 used in Example 1.

EXAMPLES 6 TO 10

Electrophotographic elements Nos. 6 to 10 were prepared in the same manner as in Example 1, except that 1-phenyl-3-(4-diethylaminostyryl)-5-(4-diethylaminophenyl)pyrazoline was used as a charge transfer material and disazo pigments as shown in the following Table 2 were used.

EXAMPLES 11 TO 15

Electrophotographic elements Nos. 11 to 15 were prepared in the same manner as in Example 1, except that 9-(4-diethylaminostyryl)anthracene was used as a charge transfer material and disazo pigments as shown in the following Table 2 were used.

EXAMPLES 16 TO 20

Electrophotographic elements Nos. 16 to 20 were prepared in the same manner as in Example 1, except that 4'-diphenylamino-alpha-phenylstilbene was used as a charge transfer material and disazo pigments as shown in the following Table 2 were used.

The thus prepared electrophotographic elements Nos. 1 to 20 were subjected to −6 KV corona discharge for 20 seconds by an electrostatic copying paper tester (SP428 Type produced by Kawaguchi Denki Works), and were charged negatively. Thereafter, these elements were left to stand in the dark for 20 seconds to measure the surface potential Vpo (V) at that time, and were exposed to radiation of a tungsten lamp so that the intensity of surface illumination may become 4.5 Lux. Then, the time (sec.) required until the surface potential was reduced to ½ of Vpo was measured, and the exposure amount $E_{\frac{1}{2}}$ (Lux-sec) was calculated. The results thus obtained are shown in Table 2.

TABLE 2

| Example | Photo-sensitizer | Disazo Pigment | Vpo(V) | $E_{\frac{1}{2}}$ (Lux.sec) |
|---------|------------------|----------------|--------|-----------------------------|
| 1  | 1  | 75  | −784  | 1.7  |
| 2  | 2  | 60  | −1367 | 2.9  |
| 3  | 3  | 16  | −1201 | 4.5  |
| 4  | 4  | 83  | −838  | 5.7  |
| 5  | 5  | 100 | −1095 | 8.3  |
| 6  | 6  | 1   | −1062 | 4.3  |
| 7  | 7  | 62  | −760  | 2.2  |
| 8  | 8  | 94  | −882  | 1.9  |
| 9  | 9  | 59  | −784  | 0.7  |
| 10 | 10 | 114 | −186  | 9.2  |
| 11 | 11 | 33  | −1394 | 6.5  |
| 12 | 12 | 97  | −1186 | 9.3  |
| 13 | 13 | 116 | −1114 | 14.3 |
| 14 | 14 | 60  | −1530 | 3.1  |
| 15 | 15 | 75  | −1066 | 2.7  |
| 16 | 16 | 71  | −1266 | 1.0  |
| 17 | 17 | 64  | −1174 | 1.5  |
| 18 | 18 | 19  | −838  | 2.6  |
| 19 | 19 | 50  | −946  | 4.2  |
| 20 | 20 | 106 | −1204 | 3.2  |

The electrophotographic elements Nos. 4 and 7 were set in an electrophotographic copying machine (Ricopy-P-500 Type produced by RICOH K.K.), and the image-formation was repeated 10,000 times. As the results, each electrophotographic element was found to form a clear-out image. It should be understood from this results that the electrophotographic element of the present invention is excellent in durability.

What is claimed is:

1. A photosensitive material for use in electrophotography, comprising: an electroconductive substrate; a photosensitive layer on said substrate, said photosensitive layer containing a disazo compound having the formula (V),

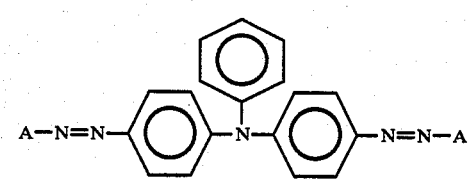

(V)

wherein A is selected from the group consisting of radicals of the formulas (VI), (VII), (VIII), (IX), (X), (XI) and (XII), (VI)

$(X_1)_n$ on ring with $(Y_1)_m$ (VII)

$X_1$, $Y_1$ on ring (VIII)

ring with $X_1$, fused to dashed Z ring (IX)

$Y_1$, $X_1$ on ring, fused to dashed Z ring $X_1$, $Y_1$ on ring, fused to dashed Z ring wherein $X_1$ is —OH, $$-\underset{R_2}{\underset{|}{N}}-R_1$$

or —NHSO$_2$—R$_3$ in which R$_1$ and R$_2$ are hydrogen, alkyl or substituted alkyl, and R$_3$ is alkyl, substituted alkyl, aryl or substituted aryl; Y$_1$ is hydrogen, halogen, alkyl, substituted alkyl, alkoxy, substituted alkoxy, carboxyl, sulfo, sulfamoyl, substituted sulfamoyl, $$-\underset{R_4}{\underset{|}{CON}}-Y_2 \text{ or } -N=\underset{R_6}{\underset{|}{C}}-R_5$$

in which R$_4$ is hydrogen, alkyl, substituted alkyl, phenyl or substituted phenyl, Y$_2$ is cyclic hydrocarbon, substituted cyclic hydrocarbon, heterocycle or substituted heterocycle, R$_5$ is cyclic hydrocarbon, substituted cyclic hydrocarbon, heterocycle, substituted heterocycle, styryl, or substituted styryl, and R$_6$ is hydrogen, alkyl, substituted alkyl, phenyl, substituted phenyl, or $$=\underset{R_6}{\underset{|}{C}}-R_5$$

forms a ring,

Z is a cyclic hydrocarbon, substituted cyclic hydrocarbon, heterocycle or substituted heterocycle;
n is an integer of 1 or 2;
m is an integer of 1 or 2;

(X)

$X_1$ on naphthalene-like fused ring with two C=O groups and N—R$_7$ (XI)

$X_1$ on naphthalene-like fused ring with two C=O groups and N—R$_7$ in which R$_7$ is hydrocarbon or substituted hydrocarbon group, and X$_1$ is the same as defined above;

(XII)

$$X_1-\underset{\underset{Ar_1}{|}}{N}\diagup{N}=\text{...}-R_8$$

in which R$_8$ is alkyl, carbamoyl, carboxyl or ester thereof, and Ar$_1$ is a cyclic hydrocarbon or substituted cyclic hydrocarbon, and X$_1$ is the same as defined above.

2. The electrophotographic element according to claim 1, wherein said coupler residue A has the formula (VII), (X), (XI) or (XII), and X$_1$ is hydroxyl.

3. The electrophotographic element according to claim 1, wherein said coupler residue A has the formula (XV), (XV)

HO, $Y_1$ on ring fused to dashed Z ring wherein Y$_1$ and Z are the same as defined above.

4. The electrophotographic element according to claim 1, wherein said coupler residue A has the formula (XVI), (XVI)

HO, CO—N(R$_2$)—Y$_2$ on ring fused to dashed Z ring wherein Z, Y$_2$ and R$_2$ are the same as defined above.

5. The electrophotographic element according to claim 1, wherein said coupler residue A has the formula (XVII) or (XVIII),

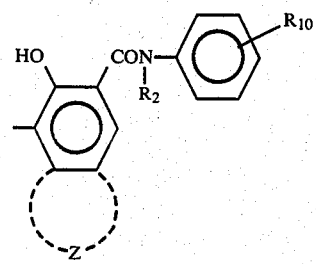
(XVII)

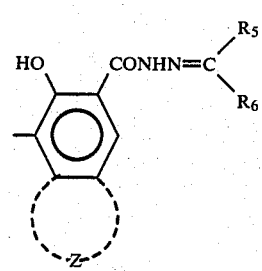
(XVIII)

wherein Z, $R_2$, $R_5$ and $R_6$ are the same as defined above, and $R_{10}$ is the same as the substituent for $Y_2$.

6. The electrophotographic element according to claim 1, in which A is

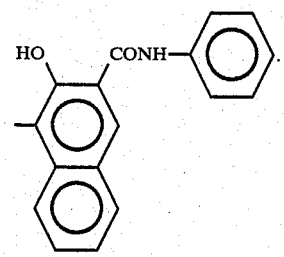

7. The electrophotographic element according to claim 1, in which A is

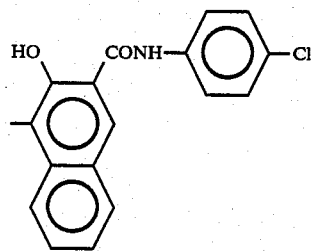

8. The electrophotographic element according to claim 1, in which A is

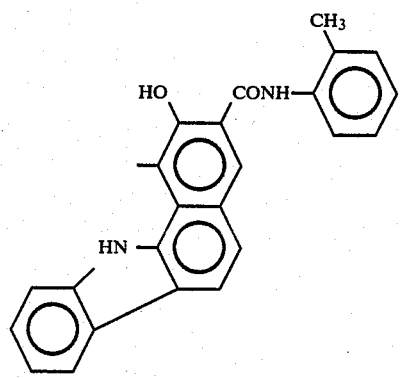

9. The electrophotographic element according to claim 1, in which A is

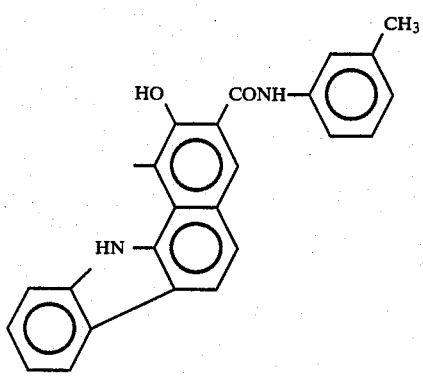

10. The electrophotographic element according to claim 1, in which A is

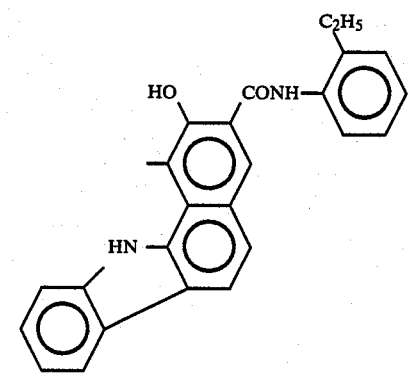

11. The electrophotographic element according to claim 1, in which A is

12. The electrophotographic element according to claim 1, in which A is

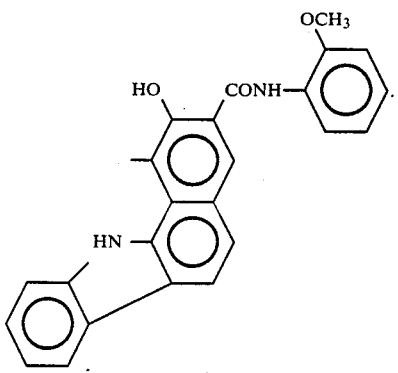

13. The electrophotographic element according to claim 1, in which A is

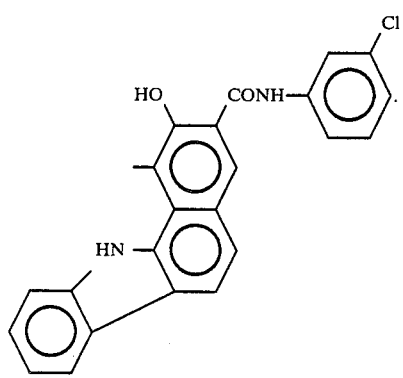

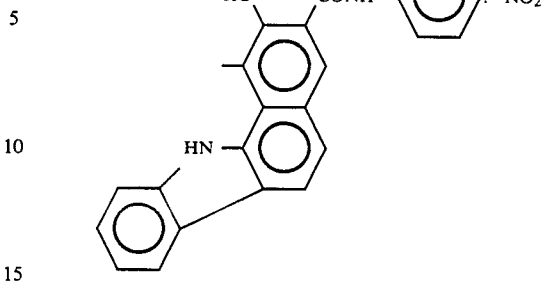

14. The electrophotographic element according to claim 1, in which Z is benzene, naphthalene, indole, carbazole, benzofuran and dibenzofuran and the substituent thereon is halogen; $Y_2$ and $R_5$ are phenyl, naphthyl, anthryl, pyridyl, thienyl, furyl, indolyl, benzofuranyl, carbazolyl, dibenzofuranyl, and the substituent thereon is alkyl, alkoxy, halogen, dialkylamino, diaralkylamino, halomethyl, nitro, cyano, carboxyl or ester thereof, hydroxyl and sulphonate; the substituent for $R_4$ is halogen; $R_7$ and $R^9$ are alkyl, benzyl, phenyl either unsubstituted or substituted with alkyl, alkoxy, halogen, hydroxyl or nitro; and $Ar_1$ is phenyl or naphthyl either unsubstituted or substituted with alkyl, alkoxy, nitro, halogen, cyano or dialkylamino.

15. The electrophotographic element according to claim 1, in which said photosensitive layer comprises a charge generating layer containing said disazo compound, and a charge transfer layer containing a charge transfer material, said charge generating layer having a thickness of from 0.01 to 5μ and containing more than 30% by weight of said disazo compound, said charge transfer layer having a thickness of from 3 to 50μ and containing from 10 to 95% by weight of said charge transfer material.

16. The electrophotographic element according to claim 1, in which said photosensitive layer is a monolayer having a thickness of from 3 to 50μ and consisting essentially of said disazo compound, charge transfer material and insulative binder, said photosensitive layer containing less than 50% by weight of said disazo compound and from 10 to 95% by weight of said charge transfer material.

* * * * *